United States Patent
Imai et al.

(10) Patent No.: US 7,402,200 B2
(45) Date of Patent: Jul. 22, 2008

(54) AQUEOUS INK, INK SET, AND IMAGE-FORMING METHOD

(75) Inventors: Takashi Imai, Yokohama (JP); Mikio Sanada, Yokohama (JP); Yasuhiro Nito, Yokohama (JP); Tetsu Iwata, Yokohama (JP); Shinichi Hakamada, Kawasaki (JP); Sadayuki Sugama, Tsukuba (JP); Hideki Takayama, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/313,670

(22) Filed: Dec. 22, 2005

(65) Prior Publication Data
US 2006/0098067 A1    May 11, 2006

Related U.S. Application Data

(63) Continuation of application No. PCT/JP2005/012278, filed on Jun. 28, 2005.

(30) Foreign Application Priority Data

| Jun. 28, 2004 | (JP) | ............................. 2004-190495 |
| Jun. 28, 2004 | (JP) | ............................. 2004-190551 |

(51) Int. Cl.
*C09D 11/02* (2006.01)
(52) U.S. Cl. ................................. 106/31.27; 106/31.6
(58) Field of Classification Search ............... 106/31.27, 106/31.6
See application file for complete search history.

(56) References Cited

U.S. PATENT DOCUMENTS

| 5,451,251 A | 9/1995 | Mafune et al. ............ 106/22 H |
| 5,571,313 A | 11/1996 | Mafune et al. ............ 106/22 H |
| 5,782,967 A | 7/1998 | Shirota et al. ............ 106/31.58 |

(Continued)

FOREIGN PATENT DOCUMENTS

EP    0 651 037 A1    5/1995

(Continued)

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

The present invention aims to provide an ink which has a sufficiently large area factor even in a small ink droplet quantity and can obtain images having a high image density, and further has a superior storage stability. According to the present invention, a cyan ink is provided which is used in an ink set having four kinds of aqueous inks consisting of a cyan ink, a magenta ink, a yellow ink and a black ink in which each ink comprises at least water, a water-insoluble coloring material, and a plurality of water-soluble organic solvents having a good medium or good mediums for the water-insoluble coloring material and a poor medium or poor mediums for the water-insoluble coloring material, wherein, the ratio $B_1/A_1$ is from 0.5 or more to 3.0 or less, where $A_1$ denotes the total content (mass %) of the good medium based on the total mass of the cyan ink and $B_1$ denotes the total content (mass %) of the poor medium based on the total mass of the cyan ink, and a water-soluble organic solvent which shows the maximum Ka value among the respective Ka values of the plurality of water-soluble organic solvents as determined by the Bristow method is the poor medium.

25 Claims, 5 Drawing Sheets

U.S. PATENT DOCUMENTS

| | | | |
|---|---|---|---|
| 5,911,815 A | 6/1999 | Yamamoto et al. | 106/31.27 |
| 6,027,210 A | 2/2000 | Kurabayashi et al. | 347/100 |
| 6,036,307 A | 3/2000 | Hakamada et al. | 347/106 |
| 6,062,674 A | 5/2000 | Inui et al. | 347/43 |
| 6,174,354 B1 | 1/2001 | Takizawa et al. | 106/31.43 |
| 6,214,963 B1 | 4/2001 | Noguchi et al. | 528/71 |
| 6,221,141 B1 | 4/2001 | Takada et al. | 106/31.6 |
| 6,280,513 B1 | 8/2001 | Osumi et al. | 106/31.6 |
| 6,332,919 B2 | 12/2001 | Osumi et al. | 106/31.6 |
| 6,375,317 B1 | 4/2002 | Osumi et al. | 347/100 |
| 6,387,168 B1 | 5/2002 | Koitabashi et al. | 106/31.6 |
| 6,398,355 B1 | 6/2002 | Shirota et al. | 347/100 |
| 6,425,662 B1 | 7/2002 | Teraoka et al. | 347/100 |
| 6,474,803 B1 | 11/2002 | Shirota et al. | 347/100 |
| 6,498,222 B1 * | 12/2002 | Kitamura et al. | 526/307.2 |
| 6,511,534 B1 | 1/2003 | Mishina et al. | 106/31.33 |
| 6,552,156 B2 | 4/2003 | Noguchi et al. | 528/71 |
| 6,641,652 B2 * | 11/2003 | Ouchi et al. | 106/31.6 |
| 6,676,254 B2 | 1/2004 | Nagashima et al. | 347/100 |
| 6,698,876 B2 | 3/2004 | Sato et al. | 347/100 |
| 6,706,105 B2 | 3/2004 | Takada et al. | 106/31.6 |
| 6,723,137 B1 | 4/2004 | Hakamada et al. | 8/549 |
| 6,770,331 B1 | 8/2004 | Mielke et al. | 427/496 |
| 6,830,329 B2 | 12/2004 | Iwata | 347/105 |
| 6,848,781 B2 | 2/2005 | Ogino et al. | 347/105 |
| 6,874,881 B2 | 4/2005 | Suzuki et al. | 347/100 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,005,461 B2 | 2/2006 | Sanada et al. | 523/160 |
| 7,029,109 B2 | 4/2006 | Shirota et al. | 347/100 |
| 7,055,943 B2 | 6/2006 | Suzuki et al. | 347/100 |
| 7,128,779 B2 | 10/2006 | Osumi et al. | 106/31.52 |
| 7,141,105 B2 | 11/2006 | Udagawa et al. | 106/31.49 |
| 7,144,449 B2 | 12/2006 | Udagawa et al. | 106/31.15 |
| 7,144,452 B2 | 12/2006 | Takayama et al. | 106/31.52 |
| 7,160,376 B2 | 1/2007 | Watanabe et al. | 106/31.6 |
| 2001/0020431 A1 | 9/2001 | Osumi et al. | 106/31.6 |
| 2002/0096085 A1 | 7/2002 | Gotoh et al. | 106/31.86 |
| 2004/0027404 A1 | 2/2004 | Nagashima et al. | 347/8 |
| 2004/0252172 A1 * | 12/2004 | Hiraoka et al. | 347/100 |
| 2005/0005818 A1 | 1/2005 | Sato et al. | 106/31.27 |
| 2005/0007436 A1 | 1/2005 | Ogino et al. | 347/105 |
| 2005/0024458 A1 * | 2/2005 | Sanada et al. | 347/100 |
| 2005/0088501 A1 * | 4/2005 | Nagashima et al. | 347/100 |
| 2005/0136208 A1 | 6/2005 | Iwata et al. | 428/41.8 |
| 2005/0195243 A1 | 9/2005 | Nagashima et al. | 347/54 |
| 2005/0204955 A1 | 9/2005 | Nagashima et al. | 106/31.59 |
| 2005/0219341 A1 | 10/2005 | Nito et al. | 347/100 |
| 2005/0282930 A1 * | 12/2005 | Fu et al. | 523/160 |
| 2006/0000386 A1 | 1/2006 | Hakamada et al. | 106/31.13 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0066699 A1 * | 3/2006 | Tokuda et al. | 347/100 |
| 2006/0089424 A1 | 4/2006 | Sanada et al. | 523/160 |
| 2006/0096498 A1 | 5/2006 | Tsujimura et al. | 106/31.27 |
| 2006/0098067 A1 | 5/2006 | Imai et al. | 347/100 |
| 2006/0098068 A1 * | 5/2006 | Hakamada et al. | 347/100 |
| 2006/0100311 A1 | 5/2006 | Tokuda et al. | 523/160 |
| 2006/0102048 A1 | 5/2006 | Nakamura et al. | 106/31.52 |
| 2006/0103703 A1 | 5/2006 | Nito et al. | 347/100 |
| 2006/0103704 A1 * | 5/2006 | Hakamada et al. | 347/100 |
| 2006/0119684 A1 | 6/2006 | Mafune et al. | 347/100 |
| 2006/0125895 A1 | 6/2006 | Nito et al. | 347/100 |
| 2006/0125896 A1 | 6/2006 | Aikawa et al. | 347/100 |
| 2006/0135647 A1 | 6/2006 | Ichinose et al. | 523/160 |
| 2006/0137570 A1 | 6/2006 | Osumi et al. | 106/31.27 |
| 2006/0139428 A1 | 6/2006 | Osumi et al. | 347/100 |
| 2006/0139429 A1 | 6/2006 | Osumi et al. | 347/100 |
| 2006/0142417 A1 | 6/2006 | Kaneko et al. | 523/160 |
| 2006/0146108 A1 | 7/2006 | Sato et al. | 347/100 |
| 2006/0152570 A1 | 7/2006 | Ishikawa et al. | 347/105 |
| 2006/0192827 A1 | 8/2006 | Takada et al. | 347/100 |
| 2006/0194056 A1 | 8/2006 | Nagashima et al. | 428/403 |
| 2006/0194897 A1 | 8/2006 | Kawabe et al. | 523/160 |
| 2006/0196389 A1 | 9/2006 | Tsuji et al. | 106/31.43 |

FOREIGN PATENT DOCUMENTS

| | | |
|---|---|---|
| EP | 1 156 086 A1 | 11/2001 |
| EP | 1 577 353 A1 | 9/2005 |
| JP | 10-279869 | 10/1998 |
| JP | 11-124527 | 5/1999 |
| JP | 2000-63719 | 2/2000 |
| JP | 2000-198955 | 7/2000 |
| JP | 2001-11348 | 1/2001 |
| JP | 2003-507517 | 2/2003 |
| JP | 2003-165932 | 6/2003 |
| JP | 2005-206615 | 8/2005 |
| WO | WO 01/40390 A1 | 6/2001 |
| WO | WO 2006/001538 | 1/2006 |

* cited by examiner

AQUEOUS INK, INK SET, AND IMAGE-FORMING METHOD

This application is a continuation of International Application No. PCT/JP2005/012278, filed Jun. 28, 2005, which claims the benefit of Japanese Patent Application No. 2004-190495 filed Jun. 28, 2004 and Japanese Patent Application No. 2004-190551 filed Jun. 28, 2004.

BACKGROUND OF THE INVENTION

1. Field of the Invention

This invention relates to an aqueous ink which contains a water-insoluble coloring material, and an ink set having the same. More particularly, it relates to an aqueous ink which is preferable in an ink-jet recording processes, and to an image-forming method which make use of the aqueous ink.

2. Description of Related Art

Conventionally, inks which contain a water-insoluble coloring material such as pigments as colorants (pigment inks) are known to give images having good fastness such as water resistance or light-resistance. In recent years, various techniques are proposed for the purpose of more improving the image density of images formed using such inks.

For example, as disclosed in Japanese Patent Application Laid-open No. 2000-198955, it is proposed to achieve much more improvement in image density by the use of an ink containing a self-dispersion type carbon black and a specific salt. As also disclosed in Japanese Patent Application Laid-open No. 2000-63719, a technique is proposed in which an ink-jet recording ink which is a composition containing a pigment, fine polymer particles, a water-soluble organic solvent and water and an aqueous solution containing a polyvalent metal salt are caused to adhere to a recording medium, and the ink composition is allowed to react with the aqueous polyvalent metal salt solution to form images having a high grade. In these techniques, in both cases, the pigment present in the ink in a dispersed state is forcedly made to flocculate on the recording medium surface to thereby keep the pigment from permeating into the recording medium, to obtain images having a much higher density.

SUMMARY OF THE INVENTION

According to studies made by the present inventors, it has been found that in the above techniques the area where the recording medium surface can be covered with the coloring material (what is called "area factor") may come insufficient compared with the volume of ink droplets, because pigment particles are made to flocculate on the recording medium. This means that in the above techniques the quantity of ink to be applied that is necessary in order to achieve the same image density comes larger than that of pigment inks in which a conventional pigment is dispersed with a polymeric dispersing agent or the like. In this regard, there has been room for improvement. A method is also available in which inks are made highly permeable into the recording medium to ensure a large area factor even when ink droplets have a small volume. However, where an ink is made highly penetrable, the ink may come permeated not only at the surface of the recording medium but also in the depth direction of the recording medium, to make it unable to achieve a sufficient image density.

The present inventors have searched for advantages and disadvantages of individual conventional inks to analyze characteristic features of images themselves. As the result, it has turned out that, as the coloring material is present in the ink in a higher concentration, the coloring material is more present in excess at the recording medium surface, dots are formed which are visually more non-uniform in shape, or, in the interior of the recording medium, the coloring material comes more wasted without participating in color development.

The present inventors have found that by solving at least one of the above technical problems, images can be formed which are superior to those in conventional cases. The problems the present inventors have found are shown below. The present invention is to solve at least one of the following problems.

(1) The problem that, where the pigment present in the ink in a dispersed state is forcedly made to flocculate on the recording medium surface, the area where the recording medium surface can be covered with the coloring material (what is called "area factor") may be insufficient compared with the volume of ink droplets, and hence the ink must be applied in a large quantity in order to achieve the same image density.

(2) The problem that, where the ink is made highly permeable, the ink may come permeated not only at the surface of the recording medium but also in the depth direction of the recording medium, to make the coloring material unable to be distributed at a high concentration in the vicinity of the surface of the recording medium and make it unable to achieve a high image density.

Accordingly, an object of the present invention is to provide, in an aqueous ink, an ink which has a sufficiently large area factor even in a small ink droplet quantity and can obtain images having a high image density, and further has a superior storage stability.

Another object of the present invention is to provide an ink set which has, in forming images by the use of inks with different colors, a sufficiently large area factor even in a small ink droplet quantity in all the inks with different colors, can also obtain images having a high image density, and can further relieve the difference in density between colors and be well balanced between colors.

A still another object of the present invention is to provide an ink set which has a sufficiently large area factor even in a small ink droplet quantity, can also obtain images having a high image density, and can further obtain images which are well balanced between colors, by using the ink set constituted as described above, in an image-forming method having the step of applying an aqueous ink containing a water-insoluble coloring material to a recording medium and the step of applying a reaction liquid capable of making the state of dispersion of the water-insoluble coloring material in the aqueous ink unstable upon contact with the aqueous ink to the recording medium (hereinafter this process is often also called "two-liquid system").

A still another object of the present invention is to provide an image-forming method which can effectively keep color mixture (bleed) from occurring at boundary areas of respective-color images where color images in which areas having colors different from one another stand adjacent are recorded on plain paper.

The above objects are achieved by the present invention described below. That is, a cyan ink according to the present invention is a cyan ink used in an ink set having four kinds of aqueous inks consisting of a cyan ink, a magenta ink, a yellow ink and a black ink in which each ink comprises at least water, a water-insoluble coloring material, and a plurality of water-soluble organic solvents having a good medium or good mediums for the water-insoluble coloring material and a poor medium or poor mediums for the water-insoluble coloring material, characterized in that;

the ratio $B_1/A_1$ is from 0.5 or more to 3.0 or less, where $A_1$ denotes the total content (mass %) of the good medium based on the total mass of the cyan ink and $B_1$ denotes the total content (mass %) of the poor medium based on the total mass of the cyan ink, and a water-soluble organic solvent which shows the maximum Ka value among the respective Ka values of the plurality of water-soluble organic solvents as determined by the Bristow method is the poor medium.

A magenta ink according to the present invention is a magenta ink used in an ink set having four kinds of aqueous inks consisting of a cyan ink, a magenta ink, a yellow ink and a black ink in which each ink comprises at least water, a water-insoluble coloring material, and a plurality of water-soluble organic solvents having a good medium or good mediums for the water-insoluble coloring material and a poor medium poor mediums for the water-insoluble coloring material, characterized in that;

the ratio $B_2/A_2$ is from 0.5 or more to 3.0 or less, where $A_2$ denotes the total content (mass %) of the good medium based on the total mass of the magenta ink and $B_2$ denotes the total content (mass %) of the poor medium based on the total mass of the magenta ink, and a water-soluble organic solvent which shows the maximum Ka value among the respective Ka values of the plurality of water-soluble organic solvents as determined by the Bristow method is the poor medium.

A yellow ink according to the present invention is a yellow ink used in an ink set having four kinds of aqueous inks consisting of a cyan ink, a magenta ink, a yellow ink and a black ink in which each ink comprises at least water, a water-insoluble coloring material, and a plurality of water-soluble organic solvents having a good medium or good mediums for the water-insoluble coloring material and a poor medium or poor mediums for the water-insoluble coloring material, characterized in that;

the ratio $B_3/A_3$ is from 0.5 or more to 3.0 or less, where $A_3$ denotes the total content (mass %) of the good medium based on the total mass of the yellow ink and $B_3$ denotes the total content (mass %) of the poor medium based on the total mass of the yellow ink, and a water-soluble organic solvent which shows the maximum Ka value among the respective Ka values of the plurality of water-soluble organic solvents as determined by the Bristow method is the poor medium.

A black ink according to the present invention is a black ink used in an ink set having four kinds of aqueous inks consisting of a cyan ink, a magenta ink, a yellow ink and a black ink in which each ink comprises at least water, a water-insoluble coloring material, and a plurality of water-soluble organic solvents having a good medium or good mediums for the water-insoluble coloring material and a poor medium or poor mediums for the water-insoluble coloring material, characterized in that;

the ratio $B_4/A_4$ is from 0.5 or more to 3.0 or less, where $A_4$ denotes the total content (mass %) of the good medium based on the total mass of the black ink and $B_4$ denotes the total content (mass %) of the poor medium based on the total mass of the black ink, and a water-soluble organic solvent which shows the maximum Ka value among the respective Ka values of the plurality of water-soluble organic solvents as determined by the Bristow method is the poor medium.

Such an ink set according to the present invention is characterized by having four kinds of aqueous inks comprising of the cyan ink constituted as described above, the magenta ink constituted as described above, the yellow ink constituted as described above, and the black ink constituted as described above.

The ink set according to the present invention is also characterized by being used in an image-forming method having the step of applying an aqueous ink constituting the ink set to a recording medium and the step of applying a reaction liquid capable of making the state of dissolution or dispersion of the water-insoluble coloring material in the aqueous ink unstable upon contact with the aqueous ink to the recording medium.

An image-forming method according to the present invention is an image-forming method which forms an image composed of an image formed by the black ink and an image formed by the color ink which are adjacent to each other, using the ink set constituted as described above, characterized in that;

scanning for applying the black ink to form the image and thereafter scanning for applying at least one-color color ink to an area adjacent to that image are performed to form the image.

According to the present invention, an ink can be provided which has a sufficiently large area factor even in a small ink droplet quantity and can obtain images having a high image density, and further has a superior storage stability. Also, according to another form of the working of the present invention, an ink set can be provided which has, in forming images by the use of inks with different colors, a sufficiently large area factor even in a small ink droplet quantity in all the inks with different colors, can also obtain images having a high image density, and can further relieve the difference in density between colors and be well balanced between colors. Still also, according to another form of the working of the present invention, an ink set can be provided which has a sufficiently large area factor even in a small ink droplet quantity, can also obtain images having a high image density, and can further obtain images which are well balanced between colors, by using in the two-liquid system the ink set constituted as described above. Further, according to another form of the working of the present invention, an image-forming method can be provided which can effectively keep color mixture (bleed) from occurring at boundary areas of respective-color images where color images in which areas having colors different from one another stand adjacent are recorded on plain paper.

BRIEF DESCRIPTION OF THE DRAWINGS

FIG. 10A shows how the ink droplet stands before it impacts; FIG. 10B, how it is immediately after it has impacted; FIG. 10C, how a dot is being formed; and FIG. 10C, how a dot having been formed is.

DETAILED DESCRIPTION OF THE INVENTION

The present invention is described below in greater detail by giving best modes for practicing the present invention.

The poor medium and good medium in the present invention are described first. Details for their definition are described later. Without regard to how to disperse the water-insoluble coloring material used as a coloring material, a water-soluble organic solvent giving good dispersion stability of the water-insoluble coloring material in the water-soluble organic solvents is defined as the good medium, and one giving bad dispersion stability, the poor medium.

A characteristic feature of the aqueous ink according to the present invention is that, taking note of water-soluble organic solvents to be incorporated in an aqueous ink together with a water-insoluble coloring material, water-soluble organic solvents having the function to make the water-insoluble coloring material dissolved or dispersed are grouped into one showing behavior as the above poor medium for the water-insoluble coloring material and one showing behavior as the above good medium for the same, and the ratio of the poor medium to the good medium in the aqueous ink (B/A value) is so controlled as to be within a specific range, to design the aqueous ink. Also, another characteristic feature of the aqueous ink according to the present invention is that, besides making the water-soluble organic solvents constituted in the above specific manner, a water-soluble organic solvent which shows the maximum Ka value (how to measure is described later) among the respective Ka values of the plurality of water-soluble organic solvents as determined by the Bristow method is the poor medium.

As the result, the dispersion stability of the water-insoluble coloring material in the ink can be very good, and at the same time the aqueous ink can be obtained which has a sufficiently large area factor even in a small ink droplet quantity and can obtain images having a high image density when printed on a recording medium, in particular, plain paper, and further has a superior storage stability. It has also been found that the use of such an aqueous ink brings marked effects such that printing speed can be made higher, recording apparatus can be made compact, cost reduction inclusive of that for consumer goods can be achieved, and moreover images formed can enjoy a superior fixability and can achieve much higher image density, enabling formation of high-grade images.

(Mechanism of Image Formation)

Here, the mechanism of image formation in the present invention is described by giving an example. Where the aqueous ink according to the present invention is applied onto a recording medium, in particular, on plain paper and images are printed thereon, it is considered that very good image density and print grade can be brought for the reasons as stated below.

Figure 10A:
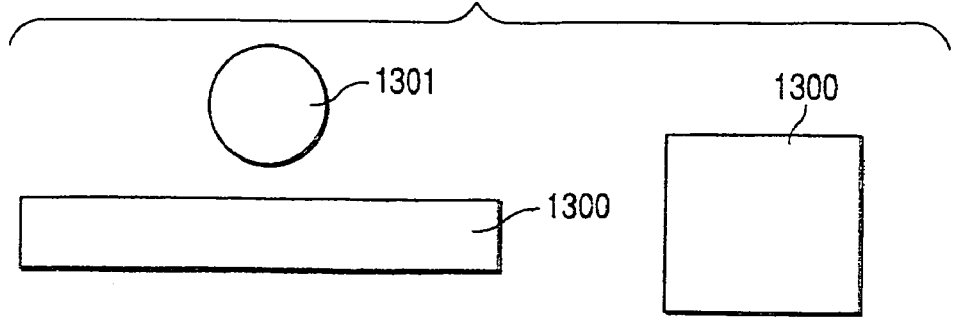
FIGS. 10A, 10B, 10C and 10D are views for diagrammatically illustrating how an ink droplet of the aqueous ink of the present invention becomes when it has impacted on the surface of a recording medium.
Figure 10B:
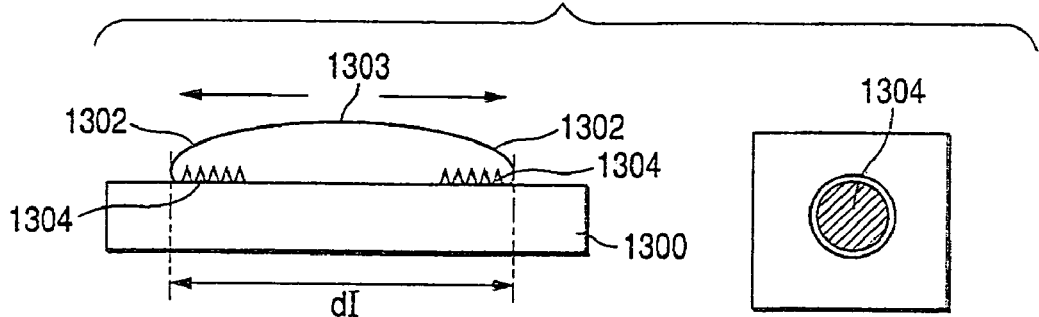
Figure 10C:
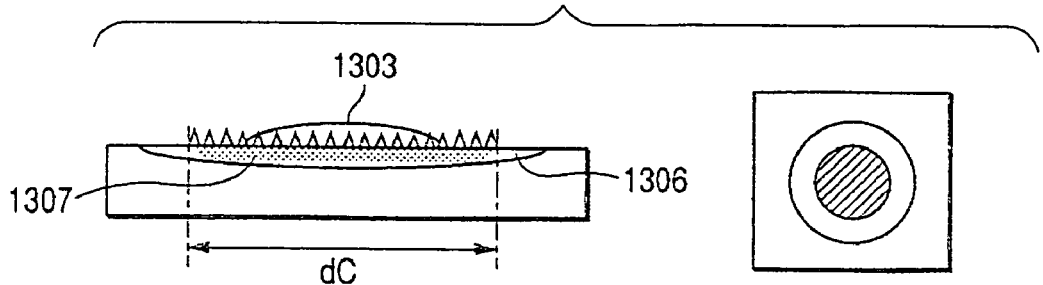

That is, as shown in FIG. 10A, where an ink droplet 1301 according to the present invention is applied to a recording medium 1300 as exemplified by plain paper and an image is printed thereon, the ink impacts on the recording medium, from the moment of which the ratio of i) the water in the ink, ii) the good medium and poor medium for the water-insoluble coloring material and iii) the water-insoluble coloring material comes to change. More specifically, as shown in FIGS. 10B and 10C, after the ink droplet 1301 has impacted to the surface of the recording medium 1300, the ink become fixed to the recording medium. As it becomes fixed, first, with evaporation of the water, a poor medium 1307 having a high Ka value among the water-soluble organic solvents in the ink diffuses in a closely true-circular shape in the vicinity of the recording medium surface as compared with a good medium having a low Ka value, and an ink dot comes to be formed, as so considered.

Figure 10D:
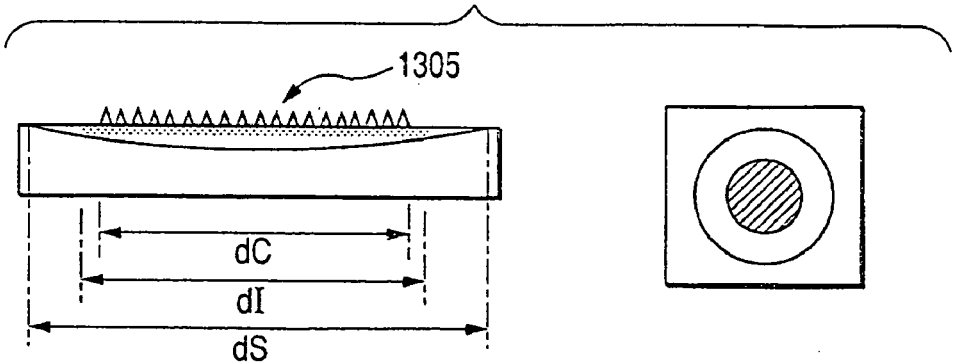

FIGS. 10B to 10D are diagrammatic illustration of how the ink becomes until it has come fixed after it has impacted on the surface of the recording medium 1300. To take note of how the ink dot extends in this case, it is considered that the concentration of the poor medium becomes higher at an outer periphery 1302 of the dot at the part of contact of ink with paper, than that at a central part 1303 of the dot. As the result, the ink dot diffuses in the vicinity of the recording medium surface in a closely true-circular shape, and, in the course of that diffusion, the concentration of the poor medium 1307 becomes abruptly higher with respect to the water-insoluble coloring material. As this occurs, the dispersion of the water-insoluble coloring material becomes abruptly unstable to cause flocculation or dispersion break of the water-insoluble coloring material. Here, the ink dot diffuses while forming its closely true-circular edge shape on the recording medium surface (see FIG. 10B), and it comes about that the water-insoluble coloring material, 1304, stays on the surface of the recording medium 1300, so that it comes as if a bank of the water-insoluble coloring material has been formed at the outer edge portion of the dot. In this way, the dot of the water-insoluble coloring material is formed in a true-circular shape, and in this state becomes fixed to the recording medium surface, as so considered (see FIG. 10C). At this point of time, the formation of the dot of the water-insoluble coloring material is completed, but the water-soluble organic solvents and water 1306 in the ink come to extend radially while diffusing further. That is, also after the dot formation of the water-insoluble coloring material has been completed, the water-soluble organic solvents and water 1306 in the ink come to diffuse in the vicinity of the recording medium surface. Subsequently thereto, because of evaporation and permeation of the water-soluble organic solvents at the central part 1303 rich in the good medium, the water-insoluble coloring material becomes deposited at this part as well, so that a dot 1305 is formed (see FIG. 10D). The image formed through the process as described above can have a sufficiently large area factor even in a small ink droplet quantity, can have a high image density and can have a high grade as having been kept from bleed.

(How to Distinguish Good Medium and Poor Medium)

Under the supposed mechanism as stated above, the good medium and poor medium used in the present invention are decided by whether or not the state of dispersion of the water-insoluble coloring material can suitably be maintained, i.e., by the relationship with the water-insoluble coloring material or a dispersing agent therefor. Accordingly, where the good medium and the poor medium are selected in preparing the aqueous ink according to the present invention, it is preferable to observe how much the state of dispersion of the water-insoluble coloring material used is stable, and select them on the basis of the result obtained. Then, under the relation to the effect of the present invention, the present inventors have made various studies on the standards of judgment of the good medium and poor medium that bring the effect of the present invention. As the result, they have found that a method of judgment as described below is effective.

First, a dispersion solution of the water-insoluble coloring material is prepared which contains 50 mass % of each water-soluble organic solvent to be judged and 45 mass % of water and also contains 5 mass % of the water-insoluble coloring material to be used in the ink. Then, the dispersion solution thus prepared is stored at 60° C. for 48 hours, where one in which the average particle size of the water-insoluble coloring material in the dispersion solution has come larger than the average particle size of the water-insoluble coloring material in a water dispersion solution containing 5 mass % of the water-insoluble coloring material and 95 mass % of water is defined as the poor medium, and one in which the average particle size of the water-insoluble coloring material in the dispersion solution has remained the same or has come smaller, as the good medium.

Stated more specifically, whether or not the water-soluble organic solvent to be used stands a good medium or stands a poor medium for a certain water-insoluble coloring material is judged in the following way. First, two types of dispersion solutions, dispersion solution A of the certain water-insoluble coloring material and water dispersion solution B of the certain water-insoluble coloring material are prepared which each contain the water-soluble organic solvent to be judged.

Dispersion solution A: A water-insoluble coloring material dispersion solution having a composition in which the water-soluble organic solvent to be judged is in a concentration of 50 mass %, the water-insoluble coloring material is in a concentration, or the water-insoluble coloring material and a substance contributing to dispersion of the same are in a concentration in total amount, of 5 mass % and the water is in a concentration of 45 mass %.

Water dispersion solution B: A water dispersion solution having a composition in which the water-insoluble coloring material is in a concentration, or the water-insoluble coloring material and a substance contributing to dispersion of the same are in a concentration in total amount, of 5 mass % and the water is in a concentration of 95 mass %.

Next, the above Dispersion solution A is stored at 60° C. for 48 hours, and thereafter cooled to ordinary temperature, and the average particle size of the water-insoluble coloring material in the resultant Dispersion solution A is measured with a fiber-optics particle analyzer (trade name: FPAR-1000; manufactured by Otsuka Electronics Co., Ltd.). Also, the above Water dispersion solution B is not stored with heating, in the state of which the average particle size of the water-insoluble coloring material is measured with a fiber-optics particle analyzer in the same manner as the above. Then, the values of average particle size of the respective water-insoluble coloring materials in the above Dispersion solution A and Water dispersion solution B are designated as particle diameter (A) and particle diameter (B), where these values are applied to the following definitions to distinguish the good medium and the poor medium.

Poor medium: Where the particle size (A) is larger than the particle size (B), the water-soluble organic solvent to be judged is defined as the poor medium.

Good medium: Where the particle size (A) is equal to the particle diameter (B) or the particle diameter (A) has come smaller than the particle diameter (B), the water-soluble organic solvent to be judged is defined as the good medium.

Using the good medium and poor medium having been judged in this way, the ink constituted according to the present invention has been prepared. As the result, it has been able to make sure that the good results as stated previously are obtained.

(Ka Value of Water-soluble Organic Solvent)

In the present invention, besides making the water-soluble organic solvents constituted in the above specific manner, a water-soluble organic solvent showing the maximum Ka value among the respective Ka values of the plurality of water-soluble organic solvents as determined by the Bristow method is the poor medium. In such a case, the mechanism of image formation as described above can be brought out.

The Ka value determined by the Bristow method is described here. This value is used as a measure which shows the permeability of a liquid into a recording medium. This is described below taking the case of an ink. Where the penetrability of an ink is represented by the ink quantity V per 1 m$^2$, the permeation quantity V (mL·m$^2$=μm) of the ink into the recording medium after a lapse of a stated time t after ink droplets have been ejected is represented by the following Bristow's equation Expression (1).

$$V=V_r+Ka(t-t_w)^{1/2}.$$  Expression (1)

The ink immediately after it has been applied to a recording medium is almost all absorbed in the recording medium at uneven portions of its surface (roughness portions of the recording medium surface), and stands little permeated into the interior (in the depth direction) of the recording medium. The time for which this takes place is the contact time ($t_w$), and the quantity of the ink absorbed at the contact time in the recording medium at its uneven portions is $V_r$. Then, the ink comes beyond the contact time after it has been applied to the recording medium, where the ink is permeated into the interior (in the depth direction) of the recording medium in its quantity proportional to the time having come beyond the contact time, i.e., to the ½ power of (t–$t_w$), so that the permeation quantity V increases. The Ka is a coefficient of proportion of the portion of this increase, and takes a value corresponding to the rate of permeation. Incidentally, the Ka value may be measured with an instrument for testing dynamic permeability of liquid by the Bristow method (e.g., Dynamic Permeability Tester S, trade name; manufactured by Toyo Seiki Seisaku-sho, Ltd.).

Incidentally, the Ka value in the present invention, measured by the Bristow method, is a value measured using as a recording medium the plain paper (e.g., PB paper, available from CANON INC., used for copying machines or page printers (laser beam printers) making use of an electrophotographic system and for printers making use of an ink-jet recording system, and PPC paper which is paper for copying machines making use of an electrophotographic system). Also, as measurement environment, an environment in usual offices or the like, of, e.g., temperature 20° C. to 25° C. and humidity 40% to 60% is estimated.

(Color Balance)

The aqueous ink according to the present invention, when the aqueous ink is fixed to a recording medium, in particular, plain paper, shows behavior different from that of conventional aqueous inks. On account of this behavior, the ink can have a sufficiently large area factor even in a small ink droplet quantity and can achieve formation of images having a high image density, and the effect of keeping the bleed from occurring that may occur when images in which areas having colors different from one another stand adjacent are recorded on plain paper.

The present inventors have further judged that, where images are formed using a plurality of aqueous inks, images having a more superior color balance can be provided when all the aqueous inks fulfill the above conditions, i.e., the ratio (B/A) of the poor medium to good medium for the water-insoluble coloring material in the ink and the condition that a water-soluble organic solvent showing the maximum Ka value is the poor medium.

Incidentally, images having good color balance or images having poor color balance are specifically meant to be images as shown below. For example, if the conditions for the aqueous ink are not fulfilled even in respect of only one color when images are formed using a plurality of aqueous inks, images may inevitably be formed which make an impression that they look partly gloomy because only that one color has a lower image density than the other colors. In the present invention, such a phenomenon is called the one that provides images having poor color balance. Also, where images having secondary color are formed using an aqueous ink satisfying the conditions for the aqueous ink of the present invention and an aqueous ink not satisfying the conditions for the aqueous ink of the present invention, the aqueous ink satisfying the conditions for the aqueous ink of the present invention always holds its coloring material in the vicinity of the surface of the recording medium. On the other hand, in the case of the aqueous ink not satisfying the conditions for the aqueous ink of the present invention, the position in the recording medium where the coloring material is present changes depending on the order of application of each ink to be applied to the recording medium, and hence colors can not be presented which are always identical. In the present invention, such a phenomenon is also called the one that provides images having poor color balance. Incidentally, this phenomenon comes about remarkably when a plurality of inks are applied to a recording medium by the use of a recording head like that shown in FIGS. 4, 5 or 6.

From the viewpoint as stated above, the present inventors have formed images using a plurality of aqueous inks all the aqueous inks of which have fulfilled the above conditions, i.e., the ratio (B/A) of the poor medium to good medium for the water-insoluble coloring material in the aqueous ink and the condition that a water-soluble organic solvent showing the maximum Ka value among the respective Ka values of the plurality of water-soluble organic solvents is the poor medium. Then, a monitor test has been conducted on the color balance of images formed. As the result, the fulfillment of the above conditions has made it able to obtain a result that the color balance of images is certainly be improved. However, some examinees have pointed out that further improvement is required.

Accordingly, at an aim to further improve the color balance of images, the present inventors put studies forward taking note of color characteristics of each color. As the result, it has turned out that images obtained using a yellow ink have so high a brightness that in some cases their image density is visually sensed not to be higher than that of images obtained using inks having other hues. Accordingly, the present inventors have reached a conclusion that it is preferable to more improve the color balance of images by more improving the brightness of images obtained using a yellow ink than that of images obtained using inks having other hues. More specifically, they have discovered that the above problem can be solved when, in all aqueous inks used when images are formed using a plurality of aqueous inks, the conditions that the ratio (B/A) of the poor medium to good medium for the water-insoluble coloring material in the aqueous ink is within a specific range and also a water-soluble organic solvent showing the maximum Ka value among the respective Ka values of the plurality of water-soluble organic solvents as determined by the Bristow method is the poor medium are fulfilled, and, at the same time, in any aqueous ink constituting the ink set other than the yellow ink, when the following expression (V) is satisfied, where A denotes the total content (mass %) of good medium based on the total mass of the aqueous ink and B denotes the total content (mass %) of poor medium based on the total mass of the aqueous ink, and $A_3$ denotes the total content (mass %) of good medium based on the total mass of the yellow ink and $B_3$ denotes the total content (mass %) of poor medium based on the total mass of the yellow ink.

$$(B_3/A_3)/(B/A)>1 \tag{V}$$

Incidentally, images have been formed using the ink set having fulfilled the above conditions, and the same monitor test as the above has been conducted to obtain the result that all the examinees have sensed that the images have a superior color balance.

(Two-liquid System)

Next, the present inventors have made studies also on a system in which images are formed using i) an aqueous ink containing a water-insoluble coloring material and ii) a reaction liquid capable of making the state of dispersion of the coloring material in the aqueous ink upon contact with the aqueous ink (hereinafter "two-liquid system").

Such a conventional two-liquid system is intended to obtain images with a high image density by leaving a coloring material at the recording medium surface layer portion in a larger quantity. Hence, an aqueous ink and a reaction liquid are brought into contact with each other immediately before, or at the same time, the aqueous ink and the reaction liquid are applied to the recording medium, to complete the reaction. As the result, an unsatisfactory area factor may come, considering the volume of ink droplets.

However, as in the present invention, the aqueous ink of the present invention is applied to a recording medium after the reaction liquid has been fixed to the recording medium, where the ink can have a sufficiently large area factor even in a small ink droplet quantity and also images having a high image density can be obtained. The reason therefor is unclear, and the present inventors presume it as stated below.

A time lag is provided while the reaction liquid is applied to the recording medium and thereafter the aqueous ink is applied. This makes the reactive component of the reaction liquid more present at a little interior place from the surface portion of the recording medium, than at the surface portion of the recording medium. The aqueous ink of the present invention is applied to the recording medium standing in this way, whereupon the phenomenon shown in FIGS. 10A to 10C takes place before the reaction of the water-insoluble coloring material with the reactive component takes place. Thereafter, the remainder of a coloring material having permeated in the depth direction causes reaction rapidly with the reactive component present in a large quantity in the recording medium surface portion at its position having come down in the depth direction a little. Hence, while the ink has a sufficiently large area factor at the surface portion of the recording medium, and inasmuch as the coloring material is kept from its permeation in the depth direction of the recording medium, images having a high image density can be obtained, as so presumed.

On the other hand, it has turned out that, if an aqueous ink not falling under the present invention is applied to a recording medium, it is very difficult to form flocculates of the coloring material at the desired positions, unless the rate of permeation of the liquid medium are elaborately balanced with the rate of flocculation of the coloring material, and hence, if such an aqueous ink not falling under the present invention is applied, the bleed-preventive performance may lower, and images having a high image density may be unobtainable.

(Aqueous Ink)

In the aqueous ink according to the present invention, it is essential that the water-soluble organic solvents in ink components are constituted as described above, in relation to the water-insoluble coloring material to be used. Except for it, the ink may be constituted as in conventional inks. Respective components constituting the aqueous ink of the present invention are described below.

—Aqueous Medium—

The aqueous medium constituting the aqueous ink according to the present invention is described here. The aqueous medium is a mixed solvent of water and the water-soluble organic solvents. In the present invention, the water-soluble organic solvents are distinguished to be grouped into the good medium and the poor medium, for the water-insoluble coloring material. Then, on the basis of the results of such judgment, it is required that the water-soluble organic solvents are so selected and appropriately mixed that at least the good medium and the poor medium may mixedly be present and also the content of each water-soluble organic solvent may come within the range specified in the present invention and that a water-soluble organic solvent which shows the maximum Ka value among the respective Ka values of the plurality of water-soluble organic solvents as determined by the Bristow method may be the poor medium, to prepare the ink. It is also required in the present invention that the content of the water-soluble organic solvents is so controlled that, the ratio B/A is from 0.5 or more to 3.0 or less, where A denotes the total content (mass %) of the good medium based on the total mass of the aqueous ink and B denotes the total content (mass %) of the poor medium based on the total mass of the aqueous ink.

The water-soluble organic solvents may specifically include, e.g., alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols whose alkylene groups have 2 to 6 carbon atoms, such as ethylene glycol, propylene glycol, butylene glycol, triethylene glycol, 1,2,6-hexanetriol, thiodiglycol, hexylene glycol and diethylene glycol; lower alkyl ether acetates such as polyethylene glycol monomethyl ether acetate; glycerol; lower alkyl ethers of polyhydric alcohols, such as ethylene glycol monomethyl(or -ethyl) ether, diethylene glycol methyl(or ethyl) ether and triethylene glycol monomethyl(or -ethyl) ether; and N-methyl-2-pyrrolidone, 2-pyrrolidone, and 1,3-dimethyl-2-imidazolidinone. Also, as the water, deionized water may preferably be used.

In a preferred embodiment of the present invention, it is preferable that at least the good medium and the poor medium are mixedly present and are so selected that a water-soluble organic solvent which shows the maximum Ka value may be the poor medium, and further, the ratio B/A is from 0.5 or more to 1.0 or less, and more preferably the value of B/A is from 0.6 or more to 1.0 or less, where A denotes the total content (mass %) of the good medium based on the total mass of the aqueous ink and B denotes the total content (mass %) of the poor medium based on the total mass of the aqueous ink.

According to detailed studies made by the present inventors, where the good medium contained in an aqueous ink is in a large content, the aqueous ink can have a superior storage stability. However, especially where the recording medium is plain paper, it is difficult to achieve a high image density. Also, where on the contrary the good medium contained in an aqueous ink is in a small content, the aqueous ink, though capable of achieving a high image density, may have an insufficient storage stability.

To cope with this, the ratio of the poor medium to the good medium in the water-soluble organic solvents in the ink is controlled as described above. This enables achievement of both the storage stability of the aqueous ink and the high image density. Further, as described previously, in deciding each water-soluble organic solvent to be incorporated in the ink, the value of the Ka value determined by the Bristow method, which is a measure representing the penetrability of ink into recording mediums, is controlled. This enables achievement of the effect that the ink can have a sufficiently large area factor even in a small ink droplet quantity and also a high image density can be materialized, which has been unable to achieve in the past.

Described here is the relationship between the ratio B/A of the poor medium to the good medium in one aqueous ink and the ratio B/A of the poor medium to the good medium in a different-color aqueous ink constituting an ink set. Incidentally, the B/A in a cyan ink is represented by $B_1/A_1$, the B/A in a magenta ink by $B_2/A_2$, the B/A in a yellow ink by $B_3/A_3$, and the B/A in a black ink by $B_4/A_4$. Here, in each aqueous ink, it is preferable to satisfy the following expressions.

Cyan Ink:

$$0.6 \leq (B_1/A_1)/(B/A) < 1.8 \quad (I)$$

Magenta Ink:

$$0.6 \leq (B_2/A_2)/(B/A) < 1.8 \quad (II)$$

Yellow Ink:

$$0.6 \leq (B_3/A_3)/(B/A) < 1.8 \quad (III)$$

Black Ink:

$$0.6 \leq (B_4/A_4)/(B/A) < 1.8 \quad (IV)$$

Incidentally, the B/A in the above expressions (I) to (IV) each is meant to be the mass ratio B/A of the poor medium to the good medium which are contained in any aqueous ink constituting the ink set, other than the aqueous ink concerned. That is, it is preferable to satisfy the foregoing in respect of any aqueous ink constituting the ink set, other than the aqueous ink concerned. In each of the above expressions (I) to (IV), it is particularly preferable that the value 0.6 of the leftmost side member is 0.7. In each of the above expressions (I) to (IV), it is particularly preferable that the value 1.8 of the rightmost side member is 1.5.

Further, according to studies made by the present inventors, from the viewpoint of more improving the quality of recorded images to be formed, the Ka value in the aqueous ink may preferably be so controlled as to be less than $1.5 \text{ mL} \cdot \text{m}^{-2} \cdot \text{msec}^{-1/2}$, and may more preferably be so controlled as to be from $0.2 \text{ mL} \cdot \text{m}^{-2} \cdot \text{msec}^{-1/2}$ or more to less than $1.5 \text{ mL} \cdot \text{m}^{-2} \cdot \text{msec}^{-1/2}$. That is, the ink may be so constituted that its Ka value is less than $1.5 \text{ mL} \cdot \text{m}^{-2} \cdot \text{msec}^{-1/2}$, where the solid-liquid phase separation takes place at an early stage in the course that the ink becomes permeated into the recording medium, to enable formation of high-quality images with much less bleed.

There are no particular limitations on the content of the water-soluble organic solvents in the aqueous ink according to the present invention. It may preferably be in the range of from 3 mass % to 50 mass %, and more preferably in the range of from 10 mass % to 35 mass %, based on the total mass of the ink. Also, the water in the aqueous ink may preferably be in a content (mass %) ranging from 50 mass % to 95 mass % based on the total mass of the ink.

In the aqueous ink according to the present invention, a case in which the total content (mass %) of the poor medium(s) is 4 mass % or more based on the total mass of the ink is also more preferred from the view point of achieving both the high image density and the storage stability of the ink. It is also preferable that the total content (mass %) of the poor medium(s) is 37.5 mass % or less, and more preferably from 5 mass % to 20 mass %, based on the total mass of the ink.

—Water-insoluble Coloring Material—

The water-insoluble coloring material constituting the aqueous ink according to the present invention is described. As the water-insoluble coloring material constituting the aqueous ink according to the present invention, any material may be used without regard to how it is dispersed. In particular, it is especially preferable to use a pigment. The pigment may specifically be, e.g., a pigment of what is called a resin dispersion type (a resin dispersion type pigment) or a pigment of a surfactant dispersion type, making use of a dispersing agent or a surfactant. Also usable are a microcapsule type pigment, in which the dispersibility of a pigment itself is improved so as to be made dispersible without use of any dispersing agent or the like, a pigment of what is called a self-dispersion type (a self-dispersion type pigment), in which hydrophilic groups have been introduced into the pigment particle surface portions, and further a modified pigment in which organic groups containing a high polymer stand chemically bonded to the pigment particle surfaces (a polymer-bonded self-dispersion type pigment). Of course, any of these pigments different in the manner of dispersion may be used in combination.

Incidentally, the water-insoluble coloring material in the present invention is one in which the water-insoluble coloring material such as the above resin dispersion type pigment, self-dispersion type pigment or polymer-bonded self-dispersion type pigment stand dispersed in an aqueous medium. That is, needless to say, the good medium and poor medium for the water-insoluble coloring material in the present invention refer to the good medium and poor medium for the resin dispersion type pigment, self-dispersion type pigment, polymer-bonded self-dispersion type pigment or the like. The water-insoluble coloring material usable in the present invention is described below.

In the present invention, the water-insoluble coloring material may preferably be in a content (mass %) of from 0.1 mass % to 15.0 mass %, and more preferably from 1.0 mass % to 10.0 mass %, based on the total mass of the ink.

(Pigment)

There are no particular limitations on the pigment usable in the aqueous ink according to the present invention, and any of those as enumerated below may be used.

As a pigment used in black ink, carbon black is preferred. Any carbon black may be used, as exemplified by furnace black, lamp black, acetylene black or channel black. Stated specifically, commercially available products are usable which are exemplified by RAVEN 7000, RAVEN 5750, RAVEN 5250, RAVEN 5000 ULTRA, RAVEN 3500, RAVEN 2000, RAVEN 1500, RAVEN 1250, RAVEN 1200, RAVEN 1190 ULTRA-II, RAVEN 1170, and RAVEN 1255 (the foregoing are available from Columbian Carbon Japan Limited); BLACK PEARLS L, REGAL 400R, REGAL 330R, REGAL 660R, MOGUL L, MONARCH 700, MONARCH 800, MONARCH 880, MONARCH 900, MONARCH 1000, MONARCH 1100, MONARCH 1300, MONARCH 1400, MONARCH 2000, and VALCAN XC-72 (the foregoing are available from Cabot Corp.); COLOR BLACK FW1, COLOR BLACK FW2, COLOR BLACK FW2V, COLOR BLACK FW18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, and SPECIAL BLACK 4 (the foregoing are available from Degussa Corp.); and No. 25, No. 33, No. 40, No. 47, No. 52, No. 900, No. 2300, MCF-88, MA600, MA7, MA8, and MA100, (the foregoing are available from Mitsubishi Chemicals, Inc.). Also usable is carbon black prepared specially newly for the present invention. However, in the present invention, examples are by no means limited to these, and any conventionally known carbon black may be used. Also, without limitation to the carbon black, magnetic fine particles of magnetite, ferrite or the like and titanium black may also be used as a black pigment.

Pigment particles used in inks other than the black ink may include various types of organic pigment particles. Such an organic pigment may include, e.g., insoluble azo pigments such as Toluidine Red, Toluidine maroon, Hanza Yellow, Benzidine Yellow and Pyrazolone Red; soluble azo pigments such as Lithol Red, Helio Bordeaux, Pigment Scarlet and Permanent Red 2B; derivatives from vat dyes, such as alizarin, indanthrone and Thioindigo maroon; phthalocyanine type pigments such as Phthalocyanine Blue and Phthalocyanine Green; quinacridone type pigments such as Quinacridone Red and Quinacridone Magenta; perylene type pigments such as Perylene Red and Perylene Scarlet; isoindolinone type pigments such as Isoindolinone Yellow and Isoindolinone Orange; imidazolone type pigments such as Benzimidazolone Yellow, Benzimidazolone Orange and Benzimidazolone Red; pyranthrone type pigments such as Pyranthrone Red and Pyranthrone Orange; and indigo type pigments, condensation azo type pigments, thioindigo type pigments, diketopyrrolopyrrole type pigments, Flavanthrone Yellow, Acyl Amide Yellow, Quinophthalone Yellow, Nickel Azo Yellow, Copper Azomethine Yellow, Perinone Orange, Anthrone Orange, Dianthraquinonyl Red, and Dioxazine Violet. Of course, without limitation to these, other organic pigments may also be used.

The organic pigments usable in the present invention, when shown by Color Index (C.I.) Number, may include, e.g., the following:

C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, 185, etc.;

C.I. Pigment Orange 16, 36, 43, 51, 55, 59, 61, 71, etc.;

C.I. Pigment Red 9, 48, 49, 52, 53, 57, 97, 122, 123, 149, 168, 175, 176, 177, 180, 192, 215, 216, 217, 220, 223, 224, 226, 228, 238, 240, 251, 255, 272, etc.;

C.I. Pigment Violet 19, 23, 29, 30, 37, 40, 50, etc.;

C.I. Pigment Blue 15, 15:1, 15:3, 15:4, 15:6, 22, 60, 64, etc.;

C.I. Pigment Green 7, 36, etc.; and

C.I. Pigment Brown 23, 25, 26, etc.

(Resin Dispersion Type Pigment)

As mentioned previously, a resin dispersion type pigment making use of a dispersing agent may be used as the water-insoluble coloring material usable in the aqueous ink according to the present invention. In this case, a compound such as a surfactant or a resin dispersing agent is required which is used to disperse such hydrophobic pigments as those enumerated above.

The surfactant may preferably be an anionic surfactant or a nonionic surfactant. The anionic surfactant may specifically include, e.g., fatty acid salts, alkyl sulfuric ester salts, alkylbenzene sulfonates, alkylnaphthalene sulfonates, dialkyl sulfosuccinates, alkylphosphoric ester salts, naphthalenesulfonic acid formalin condensation products, polyoxyethylene alkylsulfuric ester salts, and substituted derivatives of these. The nonionic surfactant may also specifically include, e.g., polyoxyethylene alkyl ethers, polyoxyethylene alkyl phenyl ethers, polyoxyethylene fatty esters, sorbitan fatty esters, polyoxyethylene sorbitan fatty esters, polyoxyethylene alkylamines, glycerol fatty esters, oxyethylene oxypropylene block polymers, and substituted derivatives of these.

The resin dispersing agent may include block copolymers, random copolymers and graft copolymers, or salts of these, composed of at least two monomers (at least one of which is a hydrophilic monomer) selected from styrene, styrene derivatives, vinyl naphthalene, vinyl naphthalene derivatives, aliphatic alcohol esters of α,β-ethylenically unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinyl alcohol, vinyl pyrrolidone, acryl amide, acryl amide derivatives, and so forth. Further, any of the block copolymers and random copolymers may be used in combination.

(Microcapsule Type Pigment)

As mentioned previously, as the water-insoluble coloring material usable in the aqueous ink according to the present invention, a microcapsule type pigment may be used which comprises a water-insoluble coloring material coated with an organic high polymer to make the former into microcapsules. As methods of coating the water-insoluble coloring material with the organic high polymer to effect microencapsulation, available are a chemical production method, a physical production method, a physicochemical method and a mechanical production method. Stated specifically, available are interfacial polymerization, in-situ polymerization, submerged curing coating, coacervation (phase separation), submerged drying, melt dispersion cooling, air suspension coating, spray drying, acid precipitation, phase inversion emulsification, and so forth.

The organic high polymer used as a material constituting a wall film substance of microcapsules may specifically include, e.g., polyamide, polyurethane, polyester, polyurea, epoxy resins, polycarbonate, urea resins, melamine resins, phenol resins, polysaccharides, gelatin, gum arabic, dextran, casein, protein, natural rubber, carboxy polymethylene, polyvinyl alcohol, polyvinyl pyrrolidone, polyvinyl acetate, polyvinyl chloride, polyvinylidene chloride, cellulose, ethyl cellulose, methyl cellulose, nitrocellulose, hydroxyethyl cellulose, cellulose acetate, polyethylene, polystyrene, polymers or copolymers of acrylic or methacrylic acid, polymers or copolymers of acrylates or methacrylates, acrylic or methacrylic acid-acrylate or methacrylate copolymers, styreneacrylic or methacrylic acid copolymers, styrene-maleic acid copolymers, sodium alginate, fatty acids, paraffin, beeswax, japan wax, hardened beef tallow, carnauba wax, and albumin. Of these, preferred are organic high polymers having an anionic group such as a carboxylic acid group or a sulfonic acid group. Also, a nonionic organic high polymer may specifically include, e.g., polyvinyl alcohol, polyethylene glycol monomethacrylate, polypropylene glycol monomethacrylate, methoxypolyethylene glycol monomethacrylate, or polymers or copolymers of these, and cationic ring-opened polymers of 2-oxazoline. In particular, completely saponified products of polyvinyl alcohol are especially preferred as having properties that they are low water-soluble, and readily soluble in hot water but sparingly soluble in cold water.

Where the phase inversion or the acid precipitation is used as the method for micro-encapsulation, an anionic organic high polymer is used as the organic high polymer constituting a wall film substance of microcapsules.

The phase inversion is a method in which a composite of an anionic organic high polymer having self-dispersibility or solubility in water and a coloring material such as a self-dispersible organic pigment or a self-dispersion type carbon black, or a mixture of a coloring material such as a self-dispersible organic pigment or a self-dispersion type carbon black, a curing agent and an anionic organic high polymer, is used as an organic solvent phase, and water is put into the organic solvent phase or the organic solvent phase is put into water to effect micro-encapsulation while effecting self-dispersion (phase inversion emulsification). Incidentally, in the phase inversion method, the microcapsules may also be produced by mixing in the organic solvent phase the water-soluble organic solvents and additives used in the ink. In particular, from the viewpoint of an advantage that a dispersion for an ink can directly be produced, it is preferable to mix an aqueous medium of the ink.

The acid precipitation is a method in which a water-containing cake is obtained by a process comprising the step of neutralizing with a basic compound part or the whole of anionic groups of an organic high polymer which contains anionic groups, followed by kneading in an aqueous medium together with a coloring material such as a self-dispersible organic pigment or a self-dispersion type carbon black and the step of making the kneaded product neutralized or acidic by adjusting its pH with an acidic compound, to precipitate the anionic group-containing organic high polymer to make it adhere to the pigment, and then the water-containing cake is made into microcapsules by neutralizing part or the whole of the anionic groups with a basic compound. This acid precipitation method enables production of an anionic micro-encapsulated pigment which is fine and contains the pigment in a large quantity.

The organic solvent used in effecting the micro-encapsulation as described above may specifically include, e.g., alkyl alcohols such as methanol, ethanol, propanol and butanol; aromatic hydrocarbons such as benzole, toluol and xylol; esters such as methyl acetate, ethyl acetate and butyl acetate; chlorinated hydrocarbons such as chloroform and ethylene dichloride; ketones such as acetone and methyl isobutyl ketone; ethers such as tetrahydrofuran and dioxane; and cellosolves such as methyl cellosolve and butyl cellosolve.

Incidentally, the microcapsules prepared by the above methods may be first separated from any of these organic solvents by centrifugation, filtration or the like and then subjecting the microcapsules thus separated to stirring and re-dispersion together with water and a necessary solvent so as to be made into the desired microcapsule type pigment. The microcapsule type pigment obtained by the methods as described above may preferably have an average particle diameter of from 50 nm to 180 nm.

(Self-dispersion Type Pigment)

As mentioned previously, as the water-insoluble coloring material usable in the aqueous ink according to the present invention, a self-dispersion type pigment may be used which has been improved in dispersibility of the pigment itself so as to be dispersible without use of any dispersing agent or the like. The self-dispersion type pigment may preferably be a pigment to the pigment particle surfaces of which a hydrophilic group has chemically been bonded directly or via other atomic group. For example, preferably usable are those in which the hydrophilic group introduced into the pigment particle surface portions is selected from the group consisting of —COOM1, —SO$_3$M1 and —PO$_3$H(M1)$_2$ (wherein M1 represents a hydrogen atom, an alkali metal, an ammonium or an organic ammonium). Further, preferably usable are those in which the above other atomic group is an alkylene group having 1 to 12 carbon atoms, a substituted or unsubstituted phenylene group or a substituted or unsubstituted naphthylene group. Besides these, also preferably usable are surface oxidation-treated self-dispersion type pigments obtained by a method in which carbon black is oxidation-treated with sodium hypochloride, a method in which carbon black is oxidized by submerged ozone treatment, and a method in which carbon black particle surfaces are modified by carrying out ozone treatment and thereafter making wet oxidation with an oxidizing agent.

(Polymer-bonded Self-dispersion Type Pigment)

As mentioned previously, as the water-insoluble coloring material usable in the aqueous ink according to the present invention, a polymer-bonded self-dispersion type pigment may be used which has been improved in dispersibility of the pigment itself so as to be dispersible without use of any dispersing agent or the like. As the polymer-bonded self-dispersion type pigment, it is preferable to use one containing a reaction product of i) a functional group having chemically been bonded to the pigment particle surfaces directly or via other atomic group and ii) a copolymer of an ionic monomer and a hydrophobic monomer. This is because the copolymerization ratio of the ionic monomer to the hydrophobic monomer which is materials for forming a copolymer used when surfaces are modified can appropriately be changed, and this enables appropriate adjustment of the hydrophilicity of the pigment having been surface-modified. Also, the types of the ionic monomer and hydrophobic monomer to be used and the combination of the both can appropriately be changed, and hence this can also provide the pigment particle surfaces with various properties.

Functional Group

The functional group of the polymer-bonded self-dispersion type pigment has chemically been bonded to the pigment particle surfaces directly or via other atomic group. The functional group is one for constituting an organic group by the reaction with a copolymer as described later. The type of the functional group is selected in relation to a functional group the copolymer holds. Taking account of the fact that the pigment is one dispersed in an aqueous medium, the reaction of the functional group with the copolymer may preferably be reaction which forms a linkage not causative of hydrolysis, e.g., an amide linkage. For this end, the functional group may be an amino group and the copolymer may be made to hold a carboxyl group, whereby the copolymer can be introduced into the pigment particle surface portions via an amide group. Alternatively, the functional group may be a carboxyl group and the copolymer may be made to hold an amino group, whereby, like the above, the copolymer can also be introduced into the pigment particle surface portions via an amide group.

Here, the functional group having chemically been bonded to the pigment particle surfaces may directly be bonded to the pigment particle surfaces or may be bonded to the pigment particle surfaces via other atomic group. However, where a copolymer having a relatively large molecular weight is to be introduced into the pigment particle surface portions, it is preferable for the functional group to be introduced into the pigment particle surface portions via other atomic group in order to avoid any mutual steric hindrance of copolymers. Incidentally, there are no particular limitations on such other atomic group as long as it is a polyvalent element or an organic group. However, for the reasons stated above, a divalent organic residual group for example may preferably be used from the viewpoint of controlling the distance of the functional group from the pigment particle surfaces. The divalent organic residual group may specifically include, e.g., alkylene groups and arylene groups (phenylene group).

Stated more specifically, for example, in Examples given layer, a pigment is allowed to react with aminophenyl(2-sulfoethyl)sulfone to introduce the aminophenyl(2-sulfoethyl)sulfone group into the pigment particle surface portions, and thereafter the amino group of pentaethylenehexamine is allowed to react with the aminophenyl(2-sulfoethyl)sulfone group to introduce the amino group as a functional group. In this case, the amino group is chemically bonded to the pigment particle surfaces via an atomic group containing the phenyl(2-sulfoethyl) group. Of course, the present invention is by no means limited to this.

Copolymer

The copolymer of an ionic monomer and a hydrophobic monomer may preferably be, e.g., an anionic copolymer having anionicity or a cationic copolymer having cationicity.

The anionic copolymer may include, e.g., a copolymer of a hydrophobic monomer and an anionic monomer, or a salt thereof.

The hydrophobic monomer may specifically include, e.g., styrene, vinyl naphthalene, alkyl methacrylates such as methyl methacrylate; phenyl methacrylate, benzyl methacrylate, 2-ethoxyethyl methacrylate, methacrylonitrile, 2-trimethylsiloxyethyl methacrylate, glycidyl methacrylate, p-tolyl methacrylate, sorbyl methacrylate, alkyl acrylates such as methyl acrylate; phenyl acrylate, benzyl acrylate, acrylonitrile, 2-trimethylsiloxyethyl acrylate, glycidyl acrylate, p-tolyl acrylate, and sorbyl acrylate. Also, the anionic monomer may specifically include, e.g., acrylic acid, methacrylic acid, and maleic acid. Of course, the present invention is by no means limited to these examples.

The anionic copolymer of the anionic monomer and hydrophobic monomer is composed of at least two monomers, which are any one selected from the above hydrophobic monomers and at least one selected from the above anionic monomers. The anionic copolymer may include block copolymers, random copolymers and graft copolymers, or salts of these.

Such an anionic copolymer may preferably one having acid value in the range of from 100 to 500, and may preferably be one in which the scattering of the acid value is within 20% of average acid value. If it has an acid value higher than the above range, the pigment particle surfaces may come so highly hydrophilic that the water and solvent in ink may remain on pigment particle surfaces after printing, so that scratch resistance and marker resistance may be brought out late on the recording medium after printing. If on the other hand it has an acid value lower than the above range, the pigment particle surfaces may come so low hydrophilic that the pigment may come dispersed in the ink with difficulty.

Incidentally, the salt of the anionic copolymer may include salts of alkali metals such as sodium, lithium and potassium, and besides ammonium salts, alkylamine salts and alkanolamine salts. Any of these may be used alone or in appropriate combination of two or more types.

Next, the cationic copolymer may include, e.g., a copolymer of a hydrophobic monomer and a cationic monomer, or a salt thereof.

As the hydrophobic monomer, the monomers exemplified above may be used. Also, the cationic monomer may specifically include, e.g., allyamine, dimethylaminoethyl methacrylate, diethylaminoethyl methacrylate, tertiary-butylaminoethyl acrylate, dimethylaminoethyl acrylate, diethylaminoethyl acrylate, dimethylaminopropyl methacrylamide, N-vinylcarazole, methacrylamide, acrylamide, and dimethyl acrylamide. Of course, the present invention is by no means limited to this.

The cationic copolymer of the cationic monomer and hydrophobic monomer is composed of at least two monomers, which are any one selected from the above hydrophobic monomers and at least one selected from the above cationic monomers. The cationic copolymer may include block copolymers, random copolymers and graft copolymers, or salts of these.

Such a cationic copolymer may preferably one having amine value in the range of from 100 to 500, and may preferably be one in which the scattering of the amine value is within 20% of average amine value. The amine value refers to the value represented correspondingly to the acid value, by the number of milligrams of KOH in neutralization of 1 g of sample.

Incidentally, the salt of the above cationic copolymer may include acetate, hydrochloric acid and nitrate. Any of these may be used alone or in appropriate combination of two or more types.

The anionic or cationic copolymer described above may have weight-average molecular weight (Mw) in the range of from 1,000 to 20,000, and more preferably in the range of from 3,000 to 20,000. Also, the cationic copolymer segment may preferably have a polydispersity Mw/Mn (Mw: weight-average molecular weight, Mn: number-average molecular weight) of 3 or less. Such an anionic or cationic copolymer may be in a content, in the ink, of from 5 mass % or more to 40 mass % or less based on the mass of the pigment particles surface-modified with the copolymer. Also, if the copolymer has a large polydispersity, the copolymer has a broad molecular weight distribution, so that the properties described above, based on molecular weight of the copolymer may be brought out with difficulty. Hence, it is more preferable for the copolymer to have a uniform molecular weight distribution.

A method of modifying the pigment by making an organic group bonded chemically to the pigment particle surfaces is described below taking the case of carbon black. The method usable here may be any method usually used, without any particular limitations, as long as it is a method in which, in respect of functional groups of pigment particle surfaces or functional groups introduced into pigment particle surface portions, the copolymer composed of the ionic monomer and the hydrophobic monomer is combined with these functional groups to make the copolymer bonded chemically to the pigment particle surfaces.

As specific examples of such a method, usable are methods shown below. Usable are a method in which polyethyleneimine is introduced into particle surface portions of the pigment such as carbon black, and the copolymer composed of the ionic monomer and hydrophobic monomer, having an amino group, is combined with terminal functional groups by diazonium reaction, and a method in which a copolymer having an amino group and a carboxyl group in the molecule is combined with particle surfaces of the pigment such as carbon black by diazonium reaction. Of these methods, a typical example is disclosed in WO 01/51566 A1.

In the above methods, where, for example, the anionic copolymer is chemically bonded to the carbon black particle surfaces, it follows that the following three steps are involved.

First step: The step of adding an aminophenyl(2-sulfoethyl)sulfone group (APSES) to carbon black by diazonium reaction.

Second step: The step of adding polyethyleneimine or pentaethylenehexamine (PEHA) to the carbon black treated with APSES.

Third step: The step of attaching the copolymer of the hydrophobic monomer and ionic monomer having carboxyl groups.

In the second step, the phenyl(2-sulfoethyl)sulfone group bonded chemically to carbon black particle surfaces is allowed to react with the amino group of the APSES, whereby the amino group is introduced as the functional group bonded chemically to the carbon black particle surfaces. Then, in the third step, for example, part of carboxyl groups the ionic monomer moieties of the copolymer have is allowed to react with the amino group to form an amide linkage, whereby the copolymer can be introduced into the carbon black particle surface portions via an atomic group which contains the phenyl(2-sulfoethyl) group, which is a residual group of the APSES, and a residual group of the PEHA.

In the above methods, where, for example, the cationic copolymer is chemically bonded to the carbon black particle surfaces, it follows that the following two steps are involved.

First step: The step of adding an aminophenyl(2-sulfoethyl)sulfone group (APSES) to carbon black by diazonium reaction.

Second step: The step of attaching the copolymer of the hydrophobic monomer and cationic monomer.

In the first step, the sulfone group is introduced as the functional group bonded chemically to the carbon black particle surfaces. Then, in the second step, for example, part of amino groups the ionic monomer moieties of the copolymer have is allowed to react with the sulfone group (nucleophilic substitution), whereby the copolymer can be introduced into the carbon black particle surface portions via an atomic group which contains the phenyl(2-sulfoethyl) group, which is a residual group of the APSES.

—Other Components—

Besides the components described above, the aqueous ink according to the present invention may make use of, as an ink component, a moisture-retentive solid matter such as urea, a urea derivative, trimethylolpropane or trimethylolethane in order to maintain moisture retention. In the aqueous ink, the moisture-retentive solid matter such as urea, a urea derivative or trimethylolpropane may commonly preferably be in a content ranging from 0.1 mass % to 20.0 mass %, and more preferably from 3.0 mass % to 10.0 mass %, based on the total mass of the ink.

Besides the components described above, the aqueous ink according to the present invention may further optionally be incorporated with various additives such as a surfactant, a pH adjuster, a rust preventive, an antiseptic agent, a mildew-proofing agent, an antioxidant, a reduction-preventive agent, an evaporation accelerator and a chelating agent.

To the aqueous ink according to the present invention, a nonionic surfactant may preferably be added in order to control surface tension and improve ejection performance. Such a nonionic surfactant may specifically include, e.g., a compound having a structure represented by any of the following structural formulae (1) to (4).

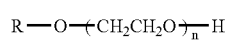

Structural formula (1)

(In the structural formula (1), R represents an alkyl group and n represents an integer.)

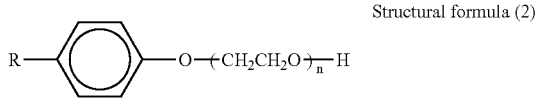

Structural formula (2)

(In the structural formula (2), R represents an alkyl group and n represents an integer.)

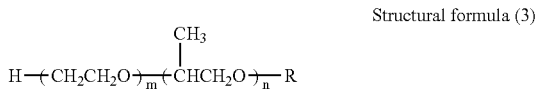

Structural formula (3)

(In the structural formula (3), R represents a hydrogen atom or an alkyl group and m and n represent each an integer.)

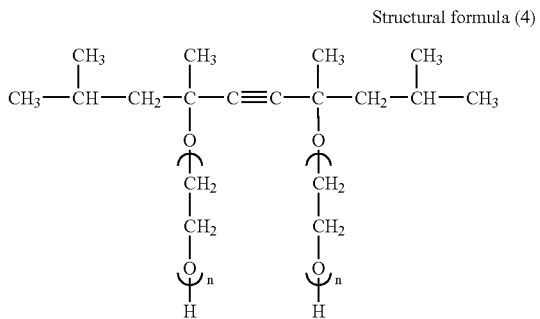

Structural formula (4)

(In the structural formula (4), m and n represent each an integer.)

In the structural formula (1), R may preferably be a straight-chain or branched alkyl group having 8 to 21 carbon atoms, and n may preferably be an integer of 5 to 40. A mixture of two or more kinds of compounds having different values of R and/or n may also be used.

In the structural formula (2), R may preferably be a straight-chain or branched alkyl group having 8 to 21 carbon atoms, and n may preferably be an integer of 5 to 40. A mixture of two or more kinds of compounds having different values of R and/or n may also be used.

In the structural formula (3), m may preferably be an integer of 1 to 10, and n an integer of 1 to 10. Incidentally, m represents the number of an ethylene oxide unit, and n the number of a propylene oxide unit, to form any of a block copolymer, an alternating copolymer and a random copolymer. A mixture of two or more kinds of compounds having different values of m and/or n may also be used.

In the structural formula (4), m may preferably be an integer of 1 to 10, and n an integer of 1 to 10. A mixture of two or more kinds of compounds having different values of m and/or n may also be used.

The compound having the structure represented by any of the above structural formulae (1) to (4) may be contained in the ink in an amount ranging from 0.05 mass % to 5 mass %, and more preferably from 0.1 mass % to 2 mass %, based on the total mass of the ink.

—Physical Properties of Ink—

The aqueous ink used in the present invention, composed of the constituents as described above, may preferably have properties that enable the ink to be well ejected from an ink-jet recording head. From the viewpoint of the performance of ejection from the ink-jet recording head, the ink may preferably be, as its properties, e.g., 1 to 15 mPa·s in viscosity and 25 mN/m (dyne/cm) or more in surface tension, and more preferably 1 to 5 mPa·s in viscosity and 25 to 50 mN/m (dyne/cm) or more in surface tension.

(Reaction Liquid)

The reaction liquid usable in the present invention contains a reactive component which makes the state of dispersion of the coloring material in the ink unstable or makes the coloring material flocculate. The reactive component lowers the dispersion stability of the water-insoluble coloring material and causes the coloring material to flocculate when the ink in which the water-insoluble coloring material stands dispersed or dissolved in the aqueous medium by the action of hydrophilic groups comes into contact with the reaction liquid on the recording medium. Incidentally, to make the state of dispersion of the coloring material in the ink unstable means that a state of flocculation or gelation is brought about when the ink and the reaction liquid have mixed.

The reactive component may specifically include, e.g., metal salts (in particular, polyvalent-metal ions and salts thereof), low-molecular cationic compounds, and cationic high polymers. The reactive component is described below.

(Polyvalent-Metal Ion and Salt Thereof)

The polyvalent-metal ion may specifically include, e.g., divalent-metal ions such as $Ca^{2+}$, $Cu^{2+}$, $Ni^{2+}$, $Mg^{2+}$, $Zn^{2+}$, $Sr^{2+}$ and $Ba^{2+}$, and trivalent-metal ions such as $Al^{3+}$, $Fe^{3+}$, $Cr^{3+}$ and $Y^{3+}$. As a method of incorporating the polyvalent-metal ion in the reaction liquid, a method is available in which a salt of a polyvalent metal is added to the reaction liquid. The salt refers to a metal salt constituted of the above polyvalent-metal ion and an anion bonded to the former ion, and must be soluble in water. A preferred anion for forming the salt may include, e.g., $Cl^-$, $NO_3^-$, $I^-$, $Br^-$, $ClO_3^-$, $SO_4^{2-}$, $CO_3^{2-}$, $CH_3COO^-$ and $HCOO^-$. Of course, the present invention is by no means limited to this. In the present invention, in view of the reactivity of the reaction liquid with the aqueous ink, the coloring performance and further the readiness to handle the reaction liquid, the polyvalent-metal ion may preferably be $Ca^{2+}$, $Mg^{2+}$, $Sr^{2+}$, $Al^{3+}$ and $Y^{3+}$. Further, $Ca^{2+}$ is particularly preferred. Also, as to the anion, $NO_3^-$ is particularly preferred in view of solubility and so forth.

In the reaction liquid, the polyvalent-metal ion may preferably be in a content of from 0.01 mass % or more to 10 mass % or less, and more preferably from 1.0 mass % or more to 5 mass % or less, based on the total mass of the reaction liquid, taking account of the effect to be brought by the present invention. In particular, in order to sufficiently bring out the function to make the state of dispersion of the water-insoluble coloring material contained in the aqueous ink unstable and in order to achieve image density at a high level, the polyvalent-metal ion may preferably be in a content of from 2.0 mass % or more to 4.0 mass % or less based on the total mass of the reaction liquid. Incidentally, the content of the polyvalent-metal ion in the reaction liquid may be more than 10 mass %. However, its incorporation in excess is usually unnecessary because, e.g., even if its content is more than 10 mass %, the function to make the state of dispersion of the water-insoluble coloring material unstable is not expected to be enhanced.

The reaction liquid may preferably contain no coloring material and be transparent. It, however, is not always necessary that the reaction liquid is one showing no absorption in the visible region. More specifically, even if it shows absorption in the visible region, it may be one showing absorption in the visible region as long as such absorption does substantially not affect images.

(Reaction Liquid Application Means)

As methods for applying the reaction liquid to the recording medium, coating methods such as roller coating, bar coating and spray coating are available. A method is also available in which, using an ink-jet recording process as in the case of the ink, the reaction liquid is made to adhere selectively to only image forming areas to which the ink is to adhere and the vicinities of the image forming areas. As a result of studies made by the present inventors on how to apply the reaction liquid to the recording medium, they have come to have a view that the roller coating is the best. This is because, even where the reaction liquid is applied in a small quantity, the state of distribution of the reactive component in the vicinity of the recording medium surface layer portion is more uniform than that in other means, and further because image quality can be superior as being free of non-uniformity at solid areas and also strike-through after the ink has been applied.

In the system in which images are formed using two liquids, various methods are available for a means by which the reaction liquid and the ink are brought into contact with each other on the recording medium. For example, a method is available in which the reaction liquid and the ink are brought into contact with each other in the state they are liquid on the recording medium, or a method in which the reaction liquid is brought into contact with the ink after the fixing of the former to the recording medium has been completed, i.e., after droplets of the reaction liquid have been absorbed into the recording medium. In the course the two-liquid system has been studied, the present inventors have reached a conclusion that, in order to secure a high image density and at the same time achieve a sufficient area factor even in a small ink droplet quantity, the method is best in which the ink is applied to the recording medium after the fixing of the reaction liquid to the recording medium has been completed.

Incidentally, the point of time where the fixing has been completed is meant by the point of time where the value of $Ka(t-t_w)^{1/2}$ represented by the Bristow's equation given previously has become larger than the quantity of the reaction liquid applied actually to the recording medium. This is meant by the point of time where the droplets of the reaction liquid have been absorbed into the recording medium, and is meant to be after t-second as calculated from the Ka value according to the Bristow method and the quantity of the reaction liquid.

(Physical Properties of Reaction Liquid and Application Amount)

The reaction liquid may preferably have a penetrability into recording medium of from $1.3\ mL \cdot m^{-2} \cdot msec^{-1/2}$ or more to $6.0\ mL \cdot m^{-2} \cdot msec^{-1/2}$ or less, and more preferably from $3.0\ mL \cdot m^{-2} \cdot msec^{-1/2}$ or more to $6.0\ mL \cdot m^{-2} \cdot msec^{-1/2}$ or less, as the Ka value found by the Bristow method. Also, the reaction liquid may preferably be applied in an application amount of from $0.5\ g/m^2$ or more to $5\ g/m^2$ or less, and more preferably from more than $2.0\ g/m^2$ to $3.0\ g/m^2$ or less.

Where a roller coating method is used to apply the reaction liquid, the reaction liquid may preferably be, as its properties, from 1 mPa·s or more to 100 mPa·s or less, and more preferably from 4 mPa·s or more to 40 mPa·s or less, in viscosity and from 15 mN/m (dyne/cm) or more to 45 mN/m (dyne/cm) or less in surface tension. This is preferable from the viewpoint of coating stability. Incidentally, the application amount of the reaction liquid may appropriately be adjusted by controlling the physical properties of the reaction liquid, the rotational speed of a roller used in a coating assembly, the pressure of contact of the roller with the recording medium, and so forth.

Where an ink-jet method is used to apply the reaction liquid, the reaction liquid may also preferably be, as its properties, from 1 mPa·s or more to 15 mPa·s or less in viscosity and from 25 mN/m (dyne/cm) or more to 50 mN/m (dyne/cm) or less in surface tension. This is preferable from the viewpoint of the performance of ejection from the recording head. Incidentally, the reaction liquid must be reacted with only a specific aqueous ink. Hence, in order that the reaction liquid does not blot at places different from the areas where images are to be recorded by a specific aqueous ink, the surface tension of the reaction liquid may preferably be made large as long as the reaction liquid can be ejected from the recording head, and made larger than the surface tension of the aqueous ink for which the state of dispersion of the water-insoluble coloring material is to be made unstable by the reaction liquid.

(Ink Set)

The aqueous ink of the present invention may preferably be used in an ink set in which four kinds of aqueous inks consisting of a cyan ink, a magenta ink, a yellow ink and a black ink are combined.

It may further be used in an ink set which is used in an image-forming method having the step of applying an aqueous ink constituting the ink set and the step of applying a reaction liquid capable of making the state of dispersion of the water-insoluble coloring material in the aqueous ink unstable upon contact with the aqueous ink. In this case, it is a more preferred embodiment that the ink set is one further having the reaction liquid capable of making the state of dispersion of the water-insoluble coloring material in the aqueous ink unstable.

Incidentally, the ink set referred to in the present invention may be of any form shown below, as long as a plurality of inks are set in combination. For example, it may include an ink set constituted of an ink tank having a structure in which tanks each holding therein a cyan ink, a magenta ink, a yellow ink and a black ink are set integral, or such an ink tank to which a head is attached; or an ink set constituted of an ink tank having a structure in which tanks each holding therein a cyan ink, a magenta ink and a yellow ink are set integral, or such an ink tank to which a head is attached; or an ink set having a structure in which individual tanks each holding therein the above inks are set up detachably from a recording apparatus. In any case, in the present invention, the characteristics of an ink alone of the present invention are specified relatively to other inks to be used (in a recording apparatus or as an ink tank). Without limitation to these forms shown above, the ink set may be of any modified form.

(Ink-jet Recording Method, Recording Unit, Cartridge, and Ink-jet Recording Apparatus)

Figure 1:
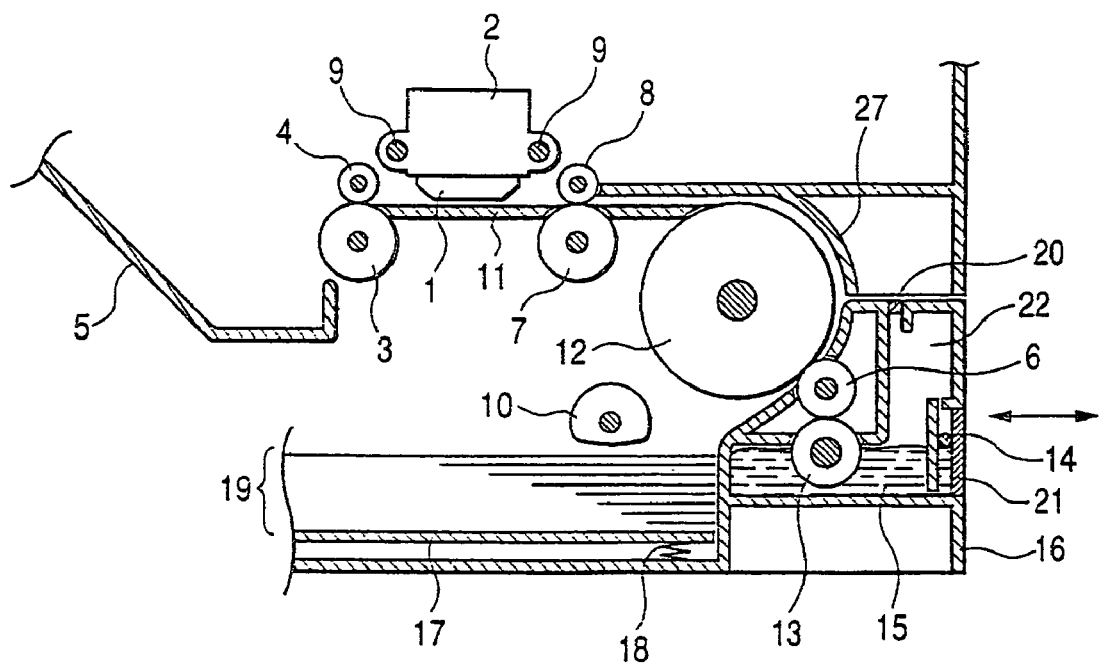
FIG. 1 is a schematic sectional side elevation showing an example of an ink-jet recording apparatus.

FIG. 1 shows an example of an ink-jet recording apparatus as a schematic sectional side elevation. This ink-jet recording apparatus employs a serial type ink-jet recording system, and has a recording head 1, a sheet feed cassette 16 having a sheet feed tray 17 from which a recording medium (hereinafter also "recording sheet") 19 is to be fed and a means for applying the reaction liquid, the sheet feed tray and the means being integrally formed, a drive means for moving the recording head reciprocally in the direction (primary scanning direction) falling at right angles with the direction of transport of the recording sheet (secondary scanning direction), and a control means which controls the drive of these constituents.

The recording head 1 is mounted to a carriage 2 in such a way that its side on which ink ejection orifices are formed is directed to the platen 11 side. Not shown in the drawing, the recording head 1 has the ink ejection orifices, a plurality of electricity-heat converters (e.g., heating elements) for heating ink fluid, and a substrate which supports the converters. Incidentally, the recording head 1 has an ink cartridge which is mounted to the interior of the carriage provided above the recording head.

The carriage 2 carries the recording head 1, and can reciprocally be moved along two guide shafts 9 extending in parallel in the width direction of the recording sheet 19. Also, the recording head 1 is driven in synchronization with the reciprocal movement of this carriage, and ejects ink droplets on the recording sheet 19 to form images. The sheet feed cassette 16 is detachable from the recording apparatus main body. Recording sheets 19 are held in a pile on the sheet feed tray 17 in the sheet feed cassette 16. At the time of sheet feeding, the uppermost sheet is brought into pressure contact with a sheet feed roller 10 by a spring 18 which presses the sheet feed tray 17 upward. This sheet feed roller 10 is a roller which is substantially semicircular in its cross-sectional shape, and is rotatingly driven by a motor (not shown). It feeds only the uppermost sheet (recording sheet 19) by the aid of separation claws (not shown).

The recording sheet 19 separated and fed is transported along a transport face of the sheet feed cassette 16 and a transport face of a sheet guide 27 by a large-diameter intermediate roller 12 and a small-diameter coating roller 6 kept in pressure contact with it. These transport faces are formed of faces which are so curved as to draw concentric arcs with respect to the intermediate roller 12. Hence, the recording sheet 19, having passed these transport faces, comes reversed in respect of its transport direction. More specifically, the side of the recording sheet 19 on which side images are to be printed faces downward until it reaches the intermediate roller 12 after it is transported from the sheet feed tray 17, but comes to face upward (recording head side) at the point of time where it faces the recording head 1. Thus, the printing side of the recording sheet always faces toward the outside of the ink-jet recording apparatus.

A reaction liquid coating means has a replenishing tank 22 which is provided inside the sheet feed cassette 16 and serves to feed a reaction liquid 15, a feed roller 13 rotatably supported in the state its peripheral surface is partly immersed in the tank 22, and a coating roller 6 which is so disposed as to be parallel to the feed roller 13 and is rotatable in contact with, and in the same direction as, the feed roller 13. Also, the coating roller 6 is so disposed that its peripheral surface comes into contact with, and in parallel to, the feed roller 13 for transporting the recording sheet 19. Thus, when the recording sheet 19 is transported, the coating roller 6 and the feed roller 13 are rotated as the intermediate roller 12 is rotated. As the result, the reaction liquid 15 is fed by the feed roller 13 to the peripheral surface of the coating roller 6, and further the recording sheet 19 held between the coating roller 6 and the intermediate roller 12 is evenly coated on its printing side with the reaction liquid 15 by the coating roller 6.

In this ink-jet recording apparatus, a float 14 is also provided in the replenishing tank 22. This float 14 is a substance having a smaller specific gravity than the reaction liquid 15, and floats on the liquid surface of the reaction liquid 15. Thus, the residual quantity of the reaction liquid containing the reactive component can visually be seen from the outside through a residual-quantity indication window 21 which is a transparent member.

Figure 2:
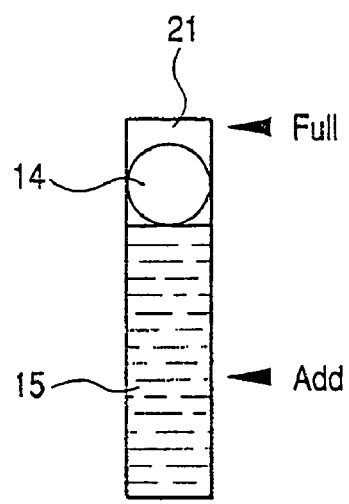
FIG. 2 is a front view of a reaction liquid residual-quantity indication of the ink-jet recording apparatus shown in FIG. 1.

FIG. 2 illustrates a residual-quantity indication as viewed from its front. The residual-quantity indication has an indication showing the degree of residual quantity of the reaction liquid, which is provided along the residual-quantity indication window 21 in its lengthwise direction. In the drawing, a case in which the liquid surface or the float 14 comes to the position indicated as "Full" shows a state of being full. On the other hand, a case in which the liquid surface or the float 14 is at the position indicated as "Add" shows that the reaction liquid is running short. Thus, it is seen at a glance that the reaction liquid 15 decreases little by little and the reaction liquid may be replenished when the float 14 has lowered to the "Add" line.

Figure 3:
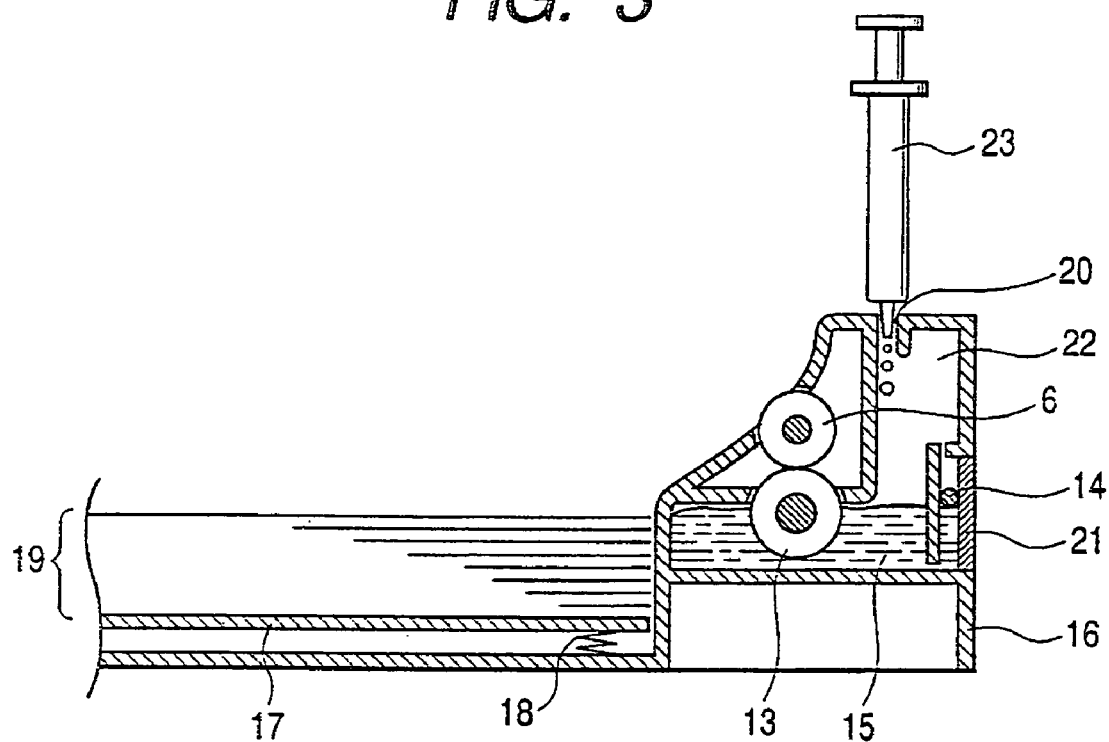
FIG. 3 is a schematic sectional side elevation showing how the ink-jet recording apparatus shown in FIG. 1 is replenished with a reaction liquid.

The reaction liquid 15 may be replenished by a method in which, as shown in FIG. 3, in the state the sheet feed cassette 16 has been drawn out of the ink-jet recording apparatus main body, the tip of an injection tool 23 is inserted in an injection opening 20 constituted of a rubber member with a cut made therein, to inject the reaction liquid into the replenishing tank 22.

Thus, the recording sheet having been coated with the reaction liquid is thereafter sent by a stated amount by a main transport roller 7 and a pinch roller 8 kept in pressure contact therewith, and is transported to a recording part, where the ink is applied from the recording head 1. The recording sheet 19 fed and image-printed in the manner as described above is delivery-transported by a delivery roller 3 and a spur 4 kept in pressure contact therewith and stacked on an output tray 5.

Where the reaction liquid is applied by a roller or the like, especially the reaction liquid may be made to have a higher viscosity than the viscosity of the ink. This is preferable because the ink can effectively be made unstable even when the reaction liquid is applied in a small quantity and also images of recorded materials can well be fixed. Stated more specifically, where the reaction liquid has a high viscosity, polyvalent metal ions can more readily remain in the vicinity of the surface of the recording medium, and hence the reaction liquid can readily react with the ink. It is preferable that the ink reacts with the reaction liquid and thereafter the coloring material components in the ink remain in the vicinity of the surface of the recording medium, where the water-soluble organic solvents, water and so forth come immediately permeated into the recording medium, namely, the solid-liquid separation takes place immediately. Hence, from the viewpoint of the fixability of images of recorded materials, it is more preferable for the reaction liquid to have a lower viscosity. In the case when the reaction liquid is applied by a roller or the like, the reaction liquid may preferably have a viscosity of from 3 mPa·s or more to 100 mPa·s or less, and more preferably from 5 mPa·s or more to 60 mPa·s or less. Incidentally, the viscosity of the reaction liquid or ink in the present invention may be measured in an environment of 25° C. by a conventional method.

(Image-Forming Method)

The image-forming method according to the present invention is described below by giving specific examples. The image-forming method according to the present invention is an image-forming method which performs recording by an ink-jet recording system on a recording medium such as plain paper by the use of a black ink and at least one-color aqueous color ink, and is characterized in that the aqueous ink of the present invention as described above is used as the black ink, and, in forming an image composed of an image formed by the black ink and an image formed by the above color ink which are adjacent to each other, scanning which applies the black ink is performed to form the image and thereafter scanning which applies the color ink to the area where the image has been formed is performed. Specific methods therefor are described below.

Figure 4:
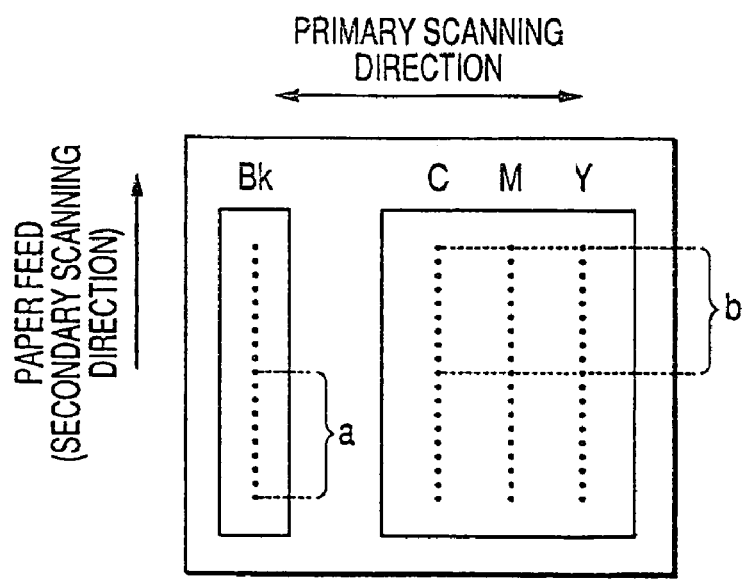
FIG. 4 illustrates an example of the construction of a recording head.

FIG. 4 shows an example of a recording head used when the image-forming method according to the present invention is carried out. The recording head has, as shown in FIG. 4, an ejection orifice line Bk for ejecting a black ink therefrom, and ejection orifice lines for ejecting therefrom three color inks of cyan (C), magenta (M) and yellow (Y), respectively.

In the image-forming method of the present invention, where full-color images are formed, a recording head may preferably be used in which the black ink ejection orifice line for ejecting the black ink therefrom and the color ink ejection orifice lines for ejecting color inks therefrom are so disposed as to be shifted in the secondary scanning direction. Stated specifically, for example, in forming images by using the recording head shown in FIG. 4, the whole area of the black ink ejection orifice line is used when only black images are formed. When full-color images having black images and color images mixedly are formed, images may preferably be so formed that the black ink uses a part a of the black ink ejection orifice line and the C, M and Y color inks use a part b of the color ink ejection orifice lines. The case in which the images having black images and color images mixedly are formed is described below in greater detail.

FIG. 4 shows an example of a recording head usable in the present invention. The recording head has the ejection orifice line Bk for ejecting a black ink therefrom, and the ejection orifice lines for ejecting therefrom three color inks of cyan (C), magenta (M) and yellow (Y), respectively. First, using the part a of the black ink ejection orifice line, the printing head is scanned in the horizontal direction in the drawing (the primary scanning direction) to form a black image in one-pass printing on the recording medium. Next, the recording medium is transported by the distance a in the vertical direction in the drawing (the secondary scanning direction), where, in the course in forward direction of the next primary scanning in the printing head, the part b of the color ink ejection orifice lines is used to form a color image in one-pass printing on the recording medium in its image area formed at the former part a of the black ink ejection orifice line. Here, the part a of the black ink ejection orifice line is forming an image in the next area. This is repeated to form the images having black images and color images mixedly.

Figure 5:
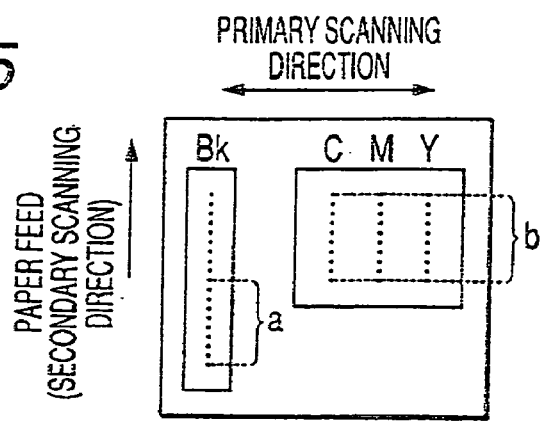
FIG. 5 illustrates an example of the construction of a recording head.

FIG. 5 shows another example of a recording head usable in the present invention. In what is shown in FIG. 5 as well, like the case of FIG. 4, the black ink uses a part a of the black ink ejection orifice line and the C, M and Y color inks use a part b corresponding to the whole area of the color ink ejection orifice lines, to form in the same way as the above the images having black images and color images mixedly.

Figure 6:
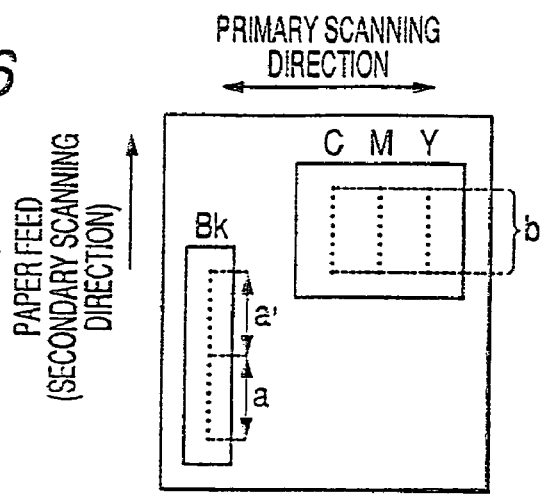
FIG. 6 illustrates an example of the construction of a recording head.

FIG. 6 shows still another example of a recording head usable in the present invention. In what is shown in FIG. 6 as well, like the case of FIG. 4, the black ink uses a part a of the black ink ejection orifice line and the C, M and Y color inks use a part b corresponding to the whole area of the color ink ejection orifice lines, to form the images having black images and color images mixedly. Here, in the recording head shown in FIG. 6, a distance is kept by a paper feed rate a' for one time, between the part a of the black ink ejection orifice line and the part b of the color ink ejection orifice lines. Hence, in the recording head thus constructed, it follows that a time lag corresponding to one-time scanning in reciprocation is produced in excess while a black image is formed and thereafter a color image is formed. Thus, in the recording head shown in FIG. 6, it has more advantageous construction than the recording head construction shown in FIG. 5, for the keeping of bleeding from occurring between the black image and the color image.

Figure 7:
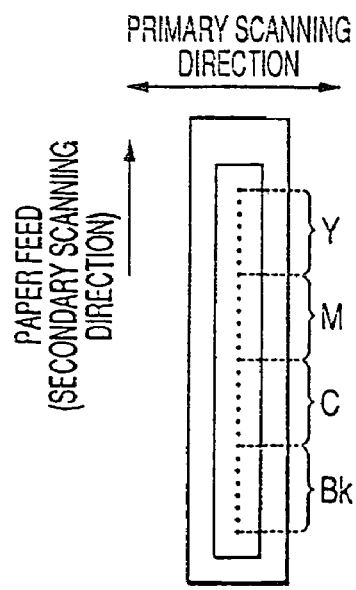
FIG. 7 illustrates an example of the construction of a recording head.

FIG. 7 shows still another example of a recording head usable in the present invention. Where, as in the recording head shown in FIG. 7, a recording head is used in which a black ink ejection orifice line and color ink ejection orifice lines are disposed in alignment in order in the secondary scanning direction, the black image is first formed and thereafter the color image is formed in accordance with the feed of paper.

Figure 8:
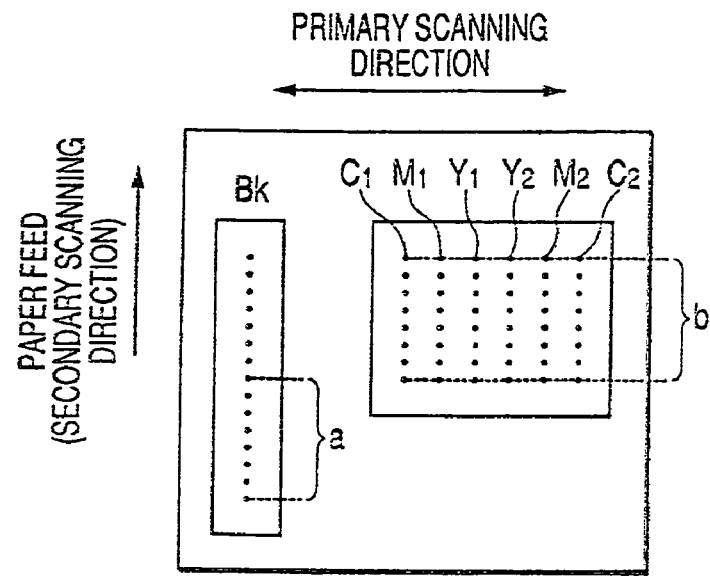
FIG. 8 illustrates an example of the construction of a recording head.

FIG. 8 shows still another example of a recording head usable in the present invention. In the recording head shown in FIG. 8, color ink ejection orifice lines are symmetrically provided in the primary scanning direction, in two files for each cyan ink (C1, C2), magenta ink (M1, M2) and yellow ink (Y1, Y2), so that the forward direction and the backward direction in the primary scanning are the same in the order of applying the color inks. As the result, this enables both-direction printing in forming the images having black images and color images mixedly. In this case, first, a part a of the black ink ejection orifice line is used to form a black image, and then the recording medium is transported by the distance a in the secondary scanning direction, where, in the course in backward direction of the next primary scanning in the printing head, a part b of the color ink ejection orifice lines is used to form a color image in one-pass printing on the recording medium in its image area formed at the former part a of the black ink ejection orifice line. Here, the part a of the black ink ejection orifice line is forming an image in the next area. This is repeated to form the images having black images and color images mixedly.

Figure 9:
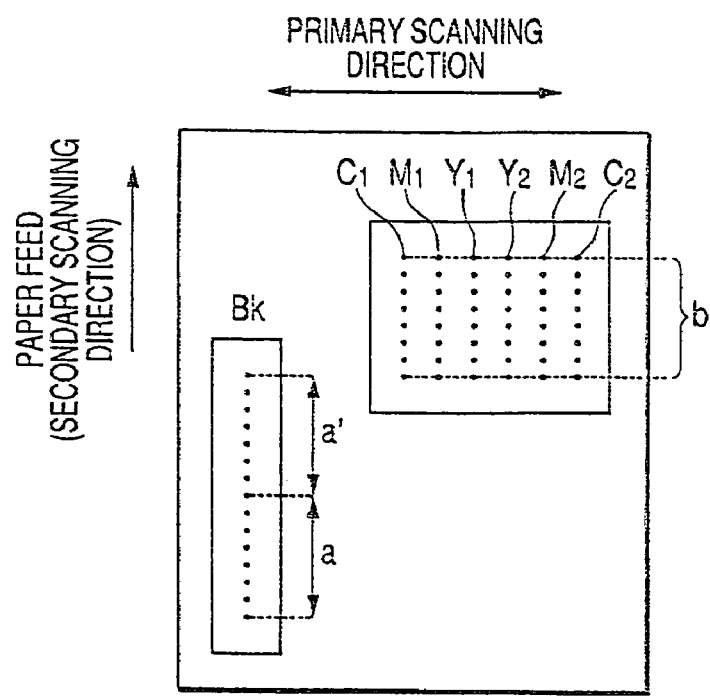
FIG. 9 illustrates an example of the construction of a recording head.

In the recording head adapted to the both-direction printing as in what is shown in FIG. 8, too, like the recording head described with reference to FIG. 6, the ink ejection orifice lines may be so disposed that a distance is kept by a paper feed rate a' for one time, between the part a of the black ink ejection orifice line and the part b of the color ink ejection orifice lines (see FIG. 9), to provide a time lag corresponding to one-time scanning in reciprocation while the black image is formed and thereafter the color image is formed, thus making the recording head have more advantageous construction for the keeping of bleed from occurring between the black image and the color image.

The image-forming method has been described above. Of course, the forms of the recording head usable in the image-forming method according to the present invention are by no means limited to those shown in FIGS. 4 to 9. Also, the number of pass differs depending on recording apparatus to be used, and hence the printing is by no means limited to the one-pass printing.

The image-forming method making use of the ink set having the reaction liquid as described above is embodied to have:

(i) the step of applying onto the recording medium a reaction liquid capable of making the state of dispersion of the water-insoluble coloring material unstable in an aqueous ink constituting the ink set; and (ii) the step of applying the aqueous ink constituting the ink set, onto the recording medium to which the reaction liquid has been fixed.

Recording Medium

As the recording medium on which images are formed using the ink set of the present invention, any recording medium may be used as long as it is a recording medium on which an ink is applied to perform recording. In particular, in the present invention, preferably used are plain paper, and a recording medium having on at least one side thereof a coating layer which receives the aqueous ink. Of course, the present invention is by no means limited to this.

The recording medium having a coating layer which receives the aqueous ink may include a recording medium having on at least one side thereof a coating layer which receives the aqueous ink, containing at least a hydrophilic polymer and/or an inorganic porous body. Where images are formed on such a recording medium, an especially good effect is brought out. As the recording medium having a coating layer which receives the aqueous ink, there are a great variety of mediums according to, e.g., the state of surface, the thickness of the coating layer, the size of pores in which the aqueous ink is to be absorbed, the difference in materials constituting such an ink absorbing layer, and further the type of a base paper. For example, it may include strongly glossy paper or glossy film, having a high surface glossiness; slightly glossy paper or semi-glossy paper, whose surface glossiness has been controlled by working or the like; matted paper, having no gloss; and trace-coated paper, having a coating layer in a small quantity.

The recording medium used in ink-jet recording is selected according to purposes. For example, used are glossy paper for obtaining images having a glossy feeling comparable to that of silver salt photographic paper, and art paper making the most of aesthetic properties (such as a cartridge paper feel, a canvas cloth feel and a Japanese paper feel) of base paper in order to favorite represent pictures, photographs, and further graphic images or the like.

Any conventionally known substance may be used as the hydrophilic polymer constituting the above coating layer of the recording medium. It may include, e.g., starch, carboxymethyl cellulose, methyl cellulose, hydroxyethyl cellulose, hydroxypropyl cellulose, alginic acid, gelatin, polyvinyl alcohol, polyvinyl acetal, polyethylene oxide, sodium polyacrylate, cross-linked polyacrylic acid, polyvinyl methyl ether, polystyrene sulfonic acid, quaternary polyvinyl pyridine, polyacrylamide, polyvinyl pyrrolidone, polyamine, aqueous urethane resins, water-soluble acrylic resins, water-soluble epoxy compounds and water-soluble polyesters. Also appropriately usable are modified products of the above polymers, as exemplified by ion-modified products such as cation-modified polyvinyl alcohol and cation-modified polyvinyl pyrrolidone. Further, the inorganic porous body used to constitute the ink receiving layer of the recording medium may include silica gel, alumina, zeolite, and porous glass.

EXAMPLES

The present invention is described below in greater detail by giving Examples, Comparative Examples and Reference Example. The present invention is by no means limited by the following Examples unless it is beyond its gist. In the following description, "part(s)" and "%" are by weight unless particularly noted.

(Preparation of Pigment Dispersion Solution and Reaction Liquid)

(Preparation of Black Pigment Dispersion Solution)

10 parts of carbon black having a specific surface area of 210 m$^2$/g and a DBP oil absorption of 74 ml·100 g, 20 parts of an aqueous solution of a styrene-acrylic acid copolymer having an acid value of 200 and a weight-average molecular weight of 10,000 and having been neutralized with an aqueous 10 mass % sodium hydroxide solution and 70 parts of ion-exchanged water were mixed, followed by dispersion for 3 hours by means of a batch type vertical sand mill. The dispersion solution obtained was centrifuged to remove coarse particles, and thereafter put to pressure filtration using a micro-filter of 3.0 μm in pore size (available from Fuji Photo Film Co., Ltd.) to prepare a resin dispersion type black pigment. Further, water was added to the resin dispersion type black pigment thus obtained, to disperse the latter in the former so as to be in a pigment concentration of 10 mass %, to prepare a dispersion solution. Thus, a black pigment dispersion solution was obtained.

(Preparation of Cyan Pigment Dispersion Solution)

10 parts of a pigment (C.I. Pigment Blue 15:3), 20 parts of an aqueous solution of a styrene-acrylic acid copolymer having an acid value of 200 and a weight-average molecular weight of 10,000 having been neutralized with an aqueous 10% by weight sodium hydroxide solution and 70 parts of ion-exchanged water were mixed, followed by dispersion for 3 hours by means of a batch type vertical sand mill. The dispersion solution obtained was centrifuged to remove coarse particles, and thereafter put to pressure filtration with a micro-filter of 3.0 μm in pore size (available from Fuji Photo Film Co., Ltd.) to prepare a resin dispersion type cyan pigment. Further, water was added to the resin dispersion type cyan pigment thus obtained, to disperse the latter in the former so as to be in a pigment concentration of 10 mass %, to prepare a dispersion solution. Thus, a cyan pigment dispersion solution was obtained.

(Preparation of Magenta Pigment Dispersion)

10 parts of a pigment (C.I. Pigment Red 122), 20 parts of an aqueous solution of a styrene-acrylic acid copolymer having an acid value of 200 and a weight-average molecular weight of 10,000 having been neutralized with an aqueous 10 mass % sodium hydroxide solution and 70 parts of ion-exchanged water were mixed, followed by dispersion for 3 hours by means of a batch type vertical sand mill. The dispersion solution obtained was centrifuged to remove coarse particles, and thereafter put to pressure filtration with a micro-filter of 3.0 μm in pore size (available from Fuji Photo Film Co., Ltd.) to prepare a resin dispersion type magenta pigment. Further, water was added to the resin dispersion type magenta pigment thus obtained, to disperse the latter in the former so as to be in a pigment concentration of 10 mass %, to prepare a dispersion solution. Thus, a magenta pigment dispersion solution was obtained.

(Preparation of Yellow Pigment Dispersion)

10 parts of a pigment (C.I. Pigment Yellow 74), 20 parts of an aqueous solution of a styrene-acrylic acid copolymer having an acid value of 200 and a weight-average molecular weight of 10,000 having been neutralized with an aqueous 10 mass % hydroxide solution and 70 parts of ion-exchanged water were mixed, followed by dispersion for 3 hours by means of a batch type vertical sand mill. The dispersion solution obtained was centrifuged to remove coarse particles, and thereafter put to pressure filtration with a micro-filter of 3.0 μm in pore size (available from Fuji Photo Film Co., Ltd.) to prepare a resin dispersion type yellow pigment. Further, water was added to the resin dispersion type yellow pigment thus obtained, to disperse the latter in the former so as to be in a pigment concentration of 10 mass %, to prepare a dispersion solution. Thus, a yellow pigment dispersion solution was obtained.

(Preparation of Reaction Liquid)

The components shown below were mixed and thoroughly stirred, followed by pressure filtration with a micro-filter of 0.2 μm in pore size (available from Fuji Photo Film Co., Ltd.) to prepare a reaction liquid.

| | |
|---|---|
| Magnesium nitrate (hexahydrate) | 15.0 mass % |
| Trimethylolpropane | 25.0 mass % |
| ACETYLENOL EH | 1.0 mass % |
| (acetylene glycol ethylene oxide adduct; available from Kawaken Fine Chemicals Co., Ltd.) | |
| Pure water | balance |

(Judgment on Good Medium/Poor Medium of Water-soluble Organic Solvent)

The following experiment was conducted in order to select the water-soluble organic solvent acting as the good medium or poor medium for the pigment contained in the above pigment dispersion solution. First, the above respective color pigment dispersion solutions having a solid content of 10 mass % were used to prepare aqueous solutions. These aqueous solutions and respective water-soluble organic solvents were used to prepare solvent-judgment dispersion solution A and solvent-judgment water dispersion solution B for judgment on good medium/poor medium according to the following mixing ratio.

Solvent-judgment Dispersion Solution A

| | |
|---|---|
| each color pigment dispersion solution with solid content concentration of 10 mass % | 50 parts |
| each water-soluble organic solvent shown in Table 1 | 50 parts |

Solvent-judgment Water Dispersion Solution B

| | |
|---|---|
| each color pigment dispersion solution with solid content concentration of 10 mass % | 50 parts |
| pure water | 50 parts |

Next, 10 g of the dispersion solution A for judgment on good medium/poor medium which was prepared as described above was put into a transparent glass sample bottle with a cap, and the bottle was closed with the cap. Thereafter, its contents were thoroughly stirred, and this was left for 48 hours in a 60° C. oven. Thereafter, the dispersion solution taken out of the 60° C. oven was used as a sample for measurement, and the average particle size of the pigment in the pigment dispersion solution was measured with a fiber-optics particle analyzer (trade name: FPAR-1000; manufactured by Otsuka Electronics Co., Ltd.). The value obtained was defined as the average particle size of the pigment in dispersion solution A for Judgment (pigment average particle size measured without dilution). Meanwhile, water dispersion solution B for Judgment was not stored with heating, and the average particle size of the pigment in this dispersion was measured with a fiber-optics particle analyzer as in the above. Then, in regard to the average particle size in solvent-judgment dispersion solution A and solvent-judgment water dispersion solution B, when the average particle size in dispersion solution A was larger than that in water dispersion solution B, the water-soluble organic solvent was judged to be poor medium, and when the average particle size in dispersion solution A was equal or smaller than that in water dispersion solution B, the water-soluble organic solvent was judged to be the good medium.

(Measurement of Ka Value on Water-soluble Organic Solvent)

First, to measure the Ka value of each water-soluble organic solvent, an aqueous dye solution with a dye concentration of 0.5 mass %, having composition shown below was prepared. Such an aqueous dye solution is used in order to color a colorless transparent sample to make it visible so that the Ka value can be measured with ease.

| | |
|---|---|
| water-soluble dye C.I. Pigment Blue 199 | 0.5 part |
| pure water | 99.5 parts |

Next, using this aqueous 0.5 mass % dye solution and each water-soluble organic solvent to be measured, each of aqueous 20% solution of colored water-soluble organic solvents having composition shown below were each prepared.

| | |
|---|---|
| above aqueous 0.5 mass % dye solution | 80 parts |
| water-soluble organic solvent shown in Table 1 | 20 parts |

Using as a measuring sample the aqueous 20 mass % solution of each colored water-soluble organic solvent, prepared as described above, each Ka value of the aqueous 20% solution of each water-soluble organic solvent was measured with a dynamic permeability tester (trade name: Dynamic Permeability Tester S; manufactured by Toyo Seiki Seisakusho, Ltd.), by the Bristow method.

(Results of Judgment and Measurement)

In respect of the water-soluble organic solvents usable in the ink, measured as described above, the results of judgment on whether they were good mediums or poor mediums for the black pigment dispersion solution, cyan pigment dispersion solution, magenta pigment dispersion solution and yellow pigment dispersion solution and the results of measurement of the Ka value in the aqueous 20 mass % solution of each water-soluble organic solvent are shown in Table 1. Incidentally, letter symbols "O" and "X" in the table stand for good medium and poor medium, respectively.

TABLE 1

| | Water-insoluble coloring materials | | | | Ka value of aqueous 20 mass % solution of water-soluble organic solvent ($ml \cdot m^2 \cdot msec^{1/2}$) |
|---|---|---|---|---|---|
| Water-soluble organic solvents: | Black pigment dispersion | Cyan pigment dispersion | Magenta pigment dispersion | Yellow pigment dispersion | |
| Glycerol | O | O | O | O | 0.13 |
| Trimethylolpropane | O | O | O | O | 0.19 |
| Polyethylene glycol 600 | X | X | X | X | 0.17 |

(Preparation of Ink)

Examples 1 to 5

The components shown in Tables 2 to 6 below were mixed and thoroughly stirred, followed by pressure filtration with a micro-filter of 3.0 μm in pore size (available from Fuji Photo Film Co., Ltd.) to prepare aqueous inks of Examples 1 to 5. Incidentally, "B/A value" in Tables is the ratio B/A where A denotes the total content (mass %) of the good medium based on the each ink and B denotes the total content (mass %) of the poor medium based on the each ink.

TABLE 2

| | Example 1 | | | |
|---|---|---|---|---|
| | Black Ink | Cyan Ink | Magenta Ink | Yellow Ink |
| Black pigment dispersion: | 50.0 | — | — | — |
| Cyan pigment dispersion: | — | 50.0 | — | — |
| Magenta pigment dispersion: | — | — | 50.0 | — |
| Yellow pigment dispersion: | — | — | — | 50.0 |
| Glycerol: | 14.0 | 13.0 | 5.0 | 5.0 |
| Polyethylene glycol 600: | 7.0 | 7.0 | 15.0 | 15.0 |
| ACETYLENOL E-100(*): | 0.1 | 0.1 | 0.1 | 0.1 |
| Pure water: | Balance | Balance | Balance | Balance |
| B/A value: | 0.50 | 0.54 | 3.00 | 3.00 |

(*)an acetylene glycol ethylene oxide adduct (surfactant available from Kawaken Fine Chemicals Co., Ltd.)

TABLE 3

| | Example 2 | | | |
|---|---|---|---|---|
| | Black Ink | Cyan Ink | Magenta Ink | Yellow Ink |
| Black pigment dispersion: | 50.0 | — | — | — |
| Cyan pigment dispersion: | — | 50.0 | — | — |
| Magenta pigment dispersion: | — | — | 50.0 | — |
| Yellow pigment dispersion: | — | — | — | 50.0 |
| Glycerol: | 7.0 | 10.0 | 10.0 | 10.0 |
| Polyethylene glycol 600: | 13.0 | 10.0 | 12.0 | 9.0 |
| ACETYLENOL E-100(*): | 0.1 | 0.1 | 0.1 | 0.1 |
| Pure water: | Balance | Balance | Balance | Balance |
| B/A value: | 1.86 | 1.00 | 1.20 | 0.90 |

(*)an acetylene glycol ethylene oxide adduct (surfactant available from Kawaken Fine Chemicals Co., Ltd.)

TABLE 4

| | Example 3 | | | |
|---|---|---|---|---|
| | Black Ink | Cyan Ink | Magenta Ink | Yellow Ink |
| Black pigment dispersion: | 50.0 | — | — | — |
| Cyan pigment dispersion: | — | 50.0 | — | — |
| Magenta pigment dispersion: | — | — | 50.0 | — |
| Yellow pigment dispersion: | — | — | — | 50.0 |
| Glycerol: | 10.0 | 10.0 | 10.0 | 12.0 |
| Polyethylene glycol 600: | 10.0 | 9.0 | 12.0 | 8.0 |
| ACETYLENOL E-100(*): | 0.1 | 0.1 | 0.1 | 0.1 |
| Pure water: | Balance | Balance | Balance | Balance |
| B/A value: | 1.00 | 0.90 | 1.20 | 0.67 |

(*)an acetylene glycol ethylene oxide adduct (surfactant available from Kawaken Fine Chemicals Co., Ltd.)

TABLE 5

| | Example 4 | | | |
|---|---|---|---|---|
| | Black Ink | Cyan Ink | Magenta Ink | Yellow Ink |
| Black pigment dispersion: | 50.0 | — | — | — |
| Cyan pigment dispersion: | — | 50.0 | — | — |
| Magenta pigment dispersion: | — | — | 50.0 | — |
| Yellow pigment dispersion: | — | — | — | 50.0 |
| Glycerol: | 10.0 | 10.0 | 10.0 | 12.0 |
| Polyethylene glycol 600: | 10.0 | 9.0 | 12.0 | 9.0 |
| ACETYLENOL E-100(*): | 0.1 | 0.1 | 0.1 | 0.1 |
| Pure water: | Balance | Balance | Balance | Balance |
| B/A value: | 1.00 | 0.90 | 1.20 | 0.75 |

(*)an acetylene glycol ethylene oxide adduct (surfactant available from Kawaken Fine Chemicals Co., Ltd.)

TABLE 6

| | Example 5 | | | |
|---|---|---|---|---|
| | Black Ink | Cyan Ink | Magenta Ink | Yellow Ink |
| Black pigment dispersion: | 50.0 | — | — | — |
| Cyan pigment dispersion: | — | 50.0 | — | — |
| Magenta pigment dispersion: | — | — | 50.0 | — |
| Yellow pigment dispersion: | — | — | — | 50.0 |
| Glycerol: | 11.0 | 10.0 | 11.0 | 10.0 |
| Polyethylene glycol 600: | 9.0 | 9.0 | 12.0 | 12.0 |
| ACETYLENOL E-100(*): | 0.1 | 0.1 | 0.1 | 0.1 |
| Pure water: | Balance | Balance | Balance | Balance |
| B/A value: | 0.82 | 0.90 | 1.09 | 1.20 |

(*)an acetylene glycol ethylene oxide adduct (surfactant available from Kawaken Fine Chemicals Co., Ltd.)

Comparative Examples 1 to 3 & Reference Example 1

The components shown in Tables 7 to 10 below were mixed and thoroughly stirred, followed by pressure filtration with a micro-filter of 3.0 μm in pore size (available from Fuji Photo Film Co., Ltd.) to prepare aqueous inks of Comparative Examples 1 to 3 and Reference Example 1. Incidentally, "B/A value" in Tables is the ratio B/A where A denotes the total content (mass %) of the good medium based on the total mass of the each ink and B denotes the total content (mass %) of the poor medium based on the each ink.

TABLE 7

| | Comparative Example 1 | | | |
|---|---|---|---|---|
| | Black Ink | Cyan Ink | Magenta Ink | Yellow Ink |
| Black pigment dispersion: | 50.0 | — | — | — |
| Cyan pigment dispersion: | — | 50.0 | — | — |
| Magenta pigment dispersion: | — | — | 50.0 | — |
| Yellow pigment dispersion: | — | — | — | 50.0 |
| Glycerol: | 16.0 | 16.0 | 16.0 | 16.0 |
| Polyethylene glycol 600: | 4.0 | 5.0 | 5.0 | 6.0 |
| ACETYLENOL E-100(*): | 0.1 | 0.1 | 0.1 | 0.1 |
| Pure water: | Balance | Balance | Balance | Balance |
| B/A value: | 0.25 | 0.31 | 0.31 | 0.38 |

(*)an acetylene glycol ethylene oxide adduct (surfactant available from Kawaken Fine Chemicals Co., Ltd.)

TABLE 8

Comparative Example 2

|  | Black Ink | Cyan Ink | Magenta Ink | Yellow Ink |
|---|---|---|---|---|
| Black pigment dispersion: | 50.0 | — | — | — |
| Cyan pigment dispersion: | — | 50.0 | — | — |
| Magenta pigment dispersion: | — | — | 50.0 | — |
| Yellow pigment dispersion: | — | — | — | 50.0 |
| Glycerol: | 5.0 | 5.0 | 5.0 | 3.0 |
| Polyethylene glycol 600: | 16.0 | 16.0 | 17.0 | 18.0 |
| ACETYLENOL E-100(*): | 0.1 | 0.1 | 0.1 | 0.1 |
| Pure water: | Balance | Balance | Balance | Balance |
| B/A value: | 3.20 | 3.20 | 3.40 | 6.00 |

(*)an acetylene glycol ethylene oxide adduct (surfactant available from Kawaken Fine Chemicals Co., Ltd.)

TABLE 9

Comparative Example 3

|  | Black Ink | Cyan Ink | Magenta Ink | Yellow Ink |
|---|---|---|---|---|
| Black pigment dispersion: | 50.0 | — | — | — |
| Cyan pigment dispersion: | — | 50.0 | — | — |
| Magenta pigment dispersion: | — | — | 50.0 | — |
| Yellow pigment dispersion: | — | — | — | 50.0 |
| Glycerol: | 9.0 | 8.0 | — | — |
| Trimethylolpropane | 5.0 | 5.0 | 5.0 | 5.0 |
| Polyethylene glycol 600: | 7.0 | 7.0 | 15.0 | 15.0 |
| ACETYLENOL E-100(*): | 0.1 | 0.1 | 0.1 | 0.1 |
| Pure water: | Balance | Balance | Balance | Balance |
| B/A value: | 0.50 | 0.54 | 3.00 | 3.00 |

(*)an acetylene glycol ethylene oxide adduct (surfactant available from Kawaken Fine Chemicals Co., Ltd.)

TABLE 10

Reference Example 1

|  | Black Ink | Cyan Ink | Magenta Ink | Yellow Ink |
|---|---|---|---|---|
| Black pigment dispersion: | 50.0 | — | — | — |
| Cyan pigment dispersion: | — | 50.0 | — | — |
| Magenta pigment dispersion: | — | — | 50.0 | — |
| Yellow pigment dispersion: | — | — | — | 50.0 |
| Glycerol: | 10.0 | 10.0 | 16.0 | 12.0 |
| Polyethylene glycol 600: | 10.0 | 9.0 | 5.0 | 8.0 |
| ACETYLENOL E-100(*): | 0.1 | 0.1 | 0.1 | 0.1 |
| Pure water: | Balance | Balance | Balance | Balance |
| B/A value: | 1.00 | 0.90 | 0.31 | 0.67 |

(*)an acetylene glycol ethylene oxide adduct (surfactant available from Kawaken Fine Chemicals Co., Ltd.)

(Evaluation 1: Image Density)

Recorded materials were produced using the respective inks of Examples 1 to 5, Comparative Examples 1 to 3 and Reference Example 1, prepared as described above. Incidentally, in producing the recorded materials, an modified apparatus of an ink-jet recording apparatus PIXUS 850i (manufactured by CANON INC.) was used, having an on-demand type multi-recording head in which heat energy is applied to an ink in accordance with recording signals to eject the ink. Stated specifically, 2 cm×2 cm solid images were formed on recording mediums shown below to produce the recorded materials. The recorded materials obtained were left for a day and thereafter their image density was measured. To measure the image density, a reflection densitometer (trade name: MACBETH RD-918; manufactured by Macbeth) was used. Evaluation criteria of the image density are as shown below. The results of evaluation are shown in Table 11.

As a printer driver, the default mode was chosen. Setting conditions of the default mode are as shown below.
Type of paper: Plain paper.
Print quality: Standard.
Color control: Automatic.

As recording mediums, used were the following sheets of plain paper.
PPC sheet PB Paper (available from CANON INC.).
PPC sheet SC250C (available from CANON INC.).
PPC sheet 4200 (available from Xerox Corp.).
High-white sheet SW-101 (available from CANON INC.).
PPC sheet 4024 (available from Xerox Corp.).

(Evaluation Criteria)
A: Sufficient image density is achievable on all types of sheets, or sufficient image density is not achievable on some types of sheets but no problem in practical use.
B: Sufficient image density is not achievable on some types of sheets.
C: Sufficient image density is not achievable on all types of sheets.

(Evaluation 2: Storage Stability)

The inks of Examples 1 to 5, Comparative Examples 1 to 3 and Reference Example 1 were each put into a shot bottle, which was then hermetically closed and stored for 2 weeks in a 60° C. oven. Thereafter, how the inks stood was observed. Evaluation criteria of the storage stability are as shown below. The results of evaluation are shown in Table 11.

(Evaluation Criteria)
A: The coloring material stands uniformly and stably dispersed in the ink.
B: The ink stands changed like a gel, or the upper part of the ink has come transparent, or the ink apparently has thickened.

(Evaluation 3: Color Balance)

Recorded materials were produced using the respective inks of Examples 1 to 5, Comparative Examples 1 to 3 and Reference Example 1, prepared as described above. Incidentally, in producing the recorded materials, the same modified apparatus of an ink-jet recording apparatus PIXUS 850i (manufactured by CANON INC.) as that in Evaluation 1 was used. Stated specifically, 2 cm×2 cm solid images were formed changing gradations, on the recording medium PPC sheet PB Paper (available from CANON INC.) to produce the recorded materials. The recorded materials obtained were left for a day and thereafter their color balance was visually observed. Evaluation criteria of the color balance are as shown below. The results of evaluation are shown in Table 11.

(Evaluation criteria)
A: Color balance is good.
B: Color balance is somewhat lost.
C: Color balance is problematic.

TABLE 11

|  | Image density | | | | Storage stability | | | | Color balance |
|---|---|---|---|---|---|---|---|---|---|
|  | Bk | C | M | Y | Bk | C | M | Y |  |
| Example: | | | | | | | | | |
| 1 | A | A | A | A | A | A | A | A | B |
| 2 | A | A | A | A | A | A | A | A | B |
| 3 | A | A | A | A | A | A | A | A | B |
| 4 | A | A | A | A | A | A | A | A | A |
| 5 | A | A | A | A | A | A | A | A | A |

TABLE 11-continued

|  | Image density | | | | Storage stability | | | | Color balance |
| --- | --- | --- | --- | --- | --- | --- | --- | --- | --- |
|  | Bk | C | M | Y | Bk | C | M | Y | |
| Comparative Example: | | | | | | | | | |
| 1 | B | B | B | B | A | A | A | A | A |
| 2 | A | A | A | A | C | C | C | C | B |
| 3 | B | B | B | B | A | A | A | A | B |
| Reference Example: | | | | | | | | | |
| 1 | A | A | B | A | A | A | A | A | C |

Bk: Black,
C: Cyan,
M: Magenta,
Y: Yellow

Incidentally, using the recorded materials obtained in Examples 4 and 5, a monitor test was conducted. As the result, many replied that the recorded material obtained in Example 5 was superior in color balance to the recorded material obtained in Example 4.

(Evaluation 4: Image Density in Two-liquid System)

Recorded materials were produced using the inks described in Example 1 and Reference Example 1 and using the reaction liquid. Incidentally, in producing the recorded materials, an modified apparatus of an ink-jet recording apparatus BJS600 (manufactured by CANON INC.) was used, having an on-demand type multi-recording head in which heat energy is applied to an ink in accordance with recording signals to eject the ink; the apparatus being so modified as to have a mechanism for applying the reaction liquid to the recording medium by means of the coating roller as shown in FIG. 1. Stated specifically, the reaction liquid was applied to recording mediums shown below, and, after the reaction liquid came fixed to the recording mediums, 2 cm×2 cm solid images were formed thereon using each ink. Incidentally, the roller speed and the contact pressure of the roll on the recording medium were so controlled that the reaction liquid was in an application amount of 2.4 g/m². The recorded materials obtained were left for a day and thereafter their image density was measured. To measure the image density, a reflection densitometer (trade name: MACBETH RD-918; manufactured by Macbeth) was used. Evaluation criteria of the image density are as shown below. The results of evaluation are shown in Table 12.

As a printer driver, the default mode was chosen. Setting conditions of the default mode are as shown below.
Type of paper: Plain paper.
Print quality: Standard.
Color control: Automatic.

As recording mediums, used were the following sheets of plain paper.
PPC sheet PB Paper (available from CANON INC.).
PPC sheet SC250C (available from CANON INC.).
PPC sheet 4200 (available from Xerox Corp.).
High-white sheet SW-101 (available from CANON INC.).
PPC sheet 4024 (available from Xerox Corp.).

(Evaluation Criteria)
A: Sufficient image density is achievable on all types of sheets, or sufficient image density is not achievable on some types of sheets but no problem in practical use.
B: Sufficient image density is not achievable on some types of sheets.
C: Sufficient image density is not achievable on all types of sheets.

Further, using the inks described in Example 1 and Reference Example 1 and using the reaction liquid, recorded materials were produced in which 2 cm×2 cm solid images were formed changing gradations, on the recording medium PPC sheet PB Paper (available from CANON INC.), having been coated with the reaction liquid. Incidentally, the recording apparatus and the reaction liquid coating conditions were the same as those in the foregoing. The recorded materials obtained were left for a day and thereafter their color balance was visually observed. Evaluation criteria of the color balance are as shown below. The results of evaluation are shown in Table 12.

(Evaluation criteria)
A: Color balance is good.
B: Color balance is somewhat lost.
C: Color balance is problematic.

TABLE 12

|  | Image density | | | | Color balance |
| --- | --- | --- | --- | --- | --- |
|  | Black | Cyan | Magenta | Yellow | |
| Example: | | | | | |
| 1 | A | A | A | A | B |
| Reference Example: | | | | | |
| 1 | A | A | C | A | C |

This application claims priority from Japanese Patent Application No. 2004-190495 filed Jun. 28, 2004, and Japanese Patent Application No. 2004-190551 filed Jun. 28, 2004 which are hereby incorporated by reference herein.

What is claimed is:

1. A cyan ink, for use in an ink set having four kinds of aqueous inks consisting of the cyan ink, a magenta ink, a yellow ink, and a black ink, in which each ink comprises at least water, a water-insoluble coloring material, and a plurality of water-soluble organic solvents having (a) a good medium or good mediums for the water-insoluble coloring material and (b) a poor medium or poor mediums for the water-insoluble coloring material, wherein:
   the ratio $B_1/A_1$ is from 0.5 or more to 3.0 or less, where $A_1$ denotes the total content (mass %) of the good medium based on the total mass of the cyan ink and $B_1$ denotes the total content (mass %) of the poor medium based on the total mass of the cyan ink; and
   a water-soluble organic solvent which shows the maximum Ka value among the respective Ka values of the plurality of water-soluble organic solvents as determined by the Bristow method is the poor medium.

2. The cyan ink according to claim 1, wherein in any aqueous ink constituting the ink set, A and B satisfies the following expression (I), where A denotes the total content (mass %) of the good medium based on the total mass of the aqueous ink and B denotes the total content (mass %) of the poor medium based on the total mass of the aqueous ink:

$$0.6 \leq (B_1/A_1)/(B/A) < 1.8 \qquad (I).$$

3. The cyan ink according to claim 1, wherein in the cyan ink, the content (mass %) of the poor medium is 4 mass % or more based on the total mass of the cyan ink.

4. A magenta ink, for use in an ink set having four kinds of aqueous inks consisting of a cyan ink, the magenta ink, a yellow ink, and a black ink, in which each ink comprises at least water, a water-insoluble coloring material, and a plurality of water-soluble organic solvents having (a) a good medium or good mediums for the water-insoluble coloring material and (b) a poor medium or poor mediums for the water-insoluble coloring material, wherein:

the ratio $B_2/A_2$ is from 0.5 or more to 3.0 or less, where $A_2$ denotes the total content (mass %) of the good medium based on the total mass of the magenta ink and $B_2$ denotes the total content (mass %) of the poor medium based on the total mass of the magenta ink; and a water-soluble organic solvent which shows the maximum Ka value among the respective Ka values of the plurality of water-soluble organic solvents as determined by the Bristow method is the poor medium.

5. The magenta ink according to claim 4, wherein in any aqueous ink constituting the ink set, A and B satisfies the following expression (II), where A denotes the total content (mass %) of the good medium based on the total mass of the aqueous ink and B denotes the total content (mass %) of the poor medium based on the total mass of the aqueous ink:

$$0.6 \leq (B_2/A_2)/(B/A) < 1.8 \qquad \text{(II)}.$$

6. The magenta ink according to claim 4, wherein in the magenta ink, the content (mass %) of the poor medium is 4 mass % or more based on the total mass of the magenta ink.

7. A yellow ink, for use in an ink set having four kinds of aqueous inks consisting of a cyan ink, a magenta ink, the yellow ink, and a black ink, in which each ink comprises at least water, a water-insoluble coloring material, and a plurality of water-soluble organic solvents having (a) a good medium or good mediums for the water-insoluble coloring material and (b) a poor medium or poor mediums for the water-insoluble coloring material, wherein:

the ratio $B_3/A_3$ is from 0.5 or more to 3.0 or less, where $A_3$ denotes the total content (mass %) of the good medium based on the total mass of the magenta ink and $B_3$ denotes the total content (mass %) of the poor medium based on the total mass of the magenta ink; and a water-soluble organic solvent which shows the maximum Ka value among the respective Ka values of the plurality of water-soluble organic solvents as determined by the Bristow method is the poor medium.

8. The yellow ink according to claim 7, wherein in any aqueous ink constituting the ink set, A and B satisfies the following expression (III), where A denotes the total content (mass %) of the good medium based on the total mass of the aqueous ink and B denotes the total content (mass %) of the poor medium based on the total mass of the aqueous ink:

$$0.6 \leq (B_3/A_3)/(B/A) < 1.8 \qquad \text{(III)}.$$

9. The yellow ink according to claim 7, wherein in the yellow ink, the content (mass %) of the poor medium is 4 mass % or more based on the total mass of the yellow ink.

10. A black ink, for use in an ink set having four kinds of aqueous inks consisting of a cyan ink, a magenta ink, a yellow ink, and the black ink, in which each ink comprises at least water, a water-insoluble coloring material, and a plurality of water-soluble organic solvents having (a) a good medium or good mediums for the water-insoluble coloring material and (b) a poor medium or poor mediums for the water-insoluble coloring material, wherein:

the ratio $B_4/A_4$ is from 0.5 or more to 3.0 or less, where $A_4$ denotes the total content (mass %) of the good medium based on the total mass of the magenta ink and $B_4$ denotes the total content (mass %) of the poor medium based on the total mass of the magenta ink; and a water-soluble organic solvent which shows the maximum Ka value among the respective Ka values of the plurality of water-soluble organic solvents as determined by the Bristow method is the poor medium.

11. The black ink according to claim 10, wherein in any aqueous ink constituting the ink set, A and B satisfies the following expression (IV), where A denotes the total content (mass %) of the good medium based on the total mass of the aqueous ink and B denotes the total content (mass %) of the poor medium based on the total mass of the aqueous ink:

$$0.6 \leq (B_4/A_4)/(B/A) < 1.8 \qquad \text{(IV)}.$$

12. The black ink according to claim 10, wherein in the black ink, wherein the total content (mass %) of the poor medium is 4 mass % or more based on the total mass of the black ink.

13. A yellow ink for use in an ink set having four kinds of aqueous inks consisting of a cyan ink, a magenta ink, a yellow ink, and a black ink, wherein:

in any aqueous ink constituting the ink set other than the yellow ink, the A and B satisfies the following expression (V), where A denotes the total content (mass %) of a good medium based on the total mass of the aqueous ink and B denotes the total content (mass %) of a poor medium based on the total mass of the aqueous ink:

$$(B_3/A_3)/(B/A) > 1 \qquad \text{(V)},$$

wherein the cyan ink, the magenta ink, the yellow ink, and the black ink each comprises at least water, a water-insoluble coloring material, and a plurality of water-soluble organic solvents having (a) a good medium or good mediums for the water-insoluble coloring material and (b) a poor medium or poor mediums for the water-insoluble coloring material, wherein:

the ratio $B_1/A_1$ is from 0.5 or more to 3.0 or less, where $A_1$ denotes the total content (mass %) of the good medium based on the total mass of the cyan ink and $B_1$ denotes the total content (mass %) of the poor medium based on the total mass of the cyan ink, and in the cyan ink, a water-soluble organic solvent which shows the maximum Ka value among the respective Ka values of the plurality of water-soluble organic solvents as determined by the Bristow method is the poor medium;

the ratio $B_2/A_2$ is from 0.5 or more to 3.0 or less, where $A_2$ denotes the total content (mass %) of the good medium based on the total mass of the magenta ink and $B_2$ denotes the total content (mass %) of the poor medium based on the total mass of the magenta ink, and in the magenta ink, a water-soluble organic solvent which shows the maximum Ka value among the respective Ka values of the plurality of water-soluble organic solvents as determined by the Bristow method is the poor medium;

the ratio $B_3/A_3$ is from 0.5 or more to 3.0 or less, where $A_3$ denotes the total content (mass %) of the good medium based on the total mass of the yellow ink and $B_3$ denotes the total content (mass %) of the poor medium based on the total mass of the yellow ink, and in the yellow ink, a water-soluble organic solvent which shows the maximum Ka value among the respective Ka values of the plurality of water-soluble organic solvents as determined by the Bristow method is the poor medium;

the ratio $B_4/A_4$ is from 0.5 or more to 3.0 or less, where $A_4$ denotes the total content (mass %) of the good medium based on the total mass of the black ink and $B_4$ denotes the total content (mass %) of the poor medium based on the total mass of the black ink, and in the black ink, a water-soluble organic solvent which shows the maximum Ka value among the respective Ka values of the plurality of water-soluble organic solvents as determined by the Bristow method is the poor medium.

14. An ink set comprising a cyan ink, a magenta ink, a yellow ink, and a black ink, wherein the cyan ink, the magenta ink, the yellow ink, and the black ink each comprises at least water, a water-insoluble coloring material, and a plurality of water-soluble organic solvents having (a) a good medium or good mediums for the water-insoluble coloring material and (b) a poor medium or poor mediums for the water-insoluble coloring material, wherein:

the ratio $B_1/A_1$ is from 0.5 or more to 3.0 or less, where $A_1$ denotes the total content (mass %) of the good medium based on the total mass of the cyan ink and $B_1$ denotes the total content (mass %) of the poor medium based on the total mass of the cyan ink, and in the cyan ink, a water-soluble organic solvent which shows the maximum Ka value among the respective Ka values of the plurality of water-soluble organic solvents as determined by the Bristow method is the poor medium;

the ratio $B_2/A_2$ is from 0.5 or more to 3.0 or less, where $A_2$ denotes the total content (mass %) of the good medium based on the total mass of the magenta ink and $B_2$ denotes the total content (mass %) of the poor medium based on the total mass of the magenta ink, and in the magenta ink, a water-soluble organic solvent which shows the maximum Ka value among the respective Ka values of the plurality of water-soluble organic solvents as determined by the Bristow method is the poor medium;

the ratio $B_3/A_3$ is from 0.5 or more to 3.0 or less, where $A_3$ denotes the total content (mass %) of the good medium based on the total mass of the yellow ink and $B_3$ denotes the total content (mass %) of the poor medium based on the total mass of the yellow ink, and in the yellow ink, a water-soluble organic solvent which shows the maximum Ka value among the respective Ka values of the plurality of water-soluble organic solvents as determined by the Bristow method is the poor medium;

the ratio $B_4/A_4$ is from 0.5 or more to 3.0 or less, where $A_4$ denotes the total content (mass %) of the good medium based on the total mass of the black ink and $B_4$ denotes the total content (mass %) of the poor medium based on the total mass of the black ink, and in the black ink, a water-soluble organic solvent which shows the maximum Ka value among the respective Ka values of the plurality of water-soluble organic solvents as determined by the Bristow method is the poor medium.

15. The ink set according to claim 14, which is used in an image-forming method having the step of applying an aqueous ink constituting the ink set to a recording medium and the step of applying a reaction liquid capable of making the state of dissolution or dispersion of a water-insoluble coloring material in the aqueous ink unstable upon contact with the aqueous ink to the recording medium.

16. An image-forming method making use of the ink set according to claim 15, the image-forming method comprising:

(i) the step of applying the reaction liquid capable of making the state of dissolution or dispersion of the water-insoluble coloring material unstable in the aqueous ink constituting the ink set to a recording medium; and (ii) the step of applying the aqueous ink constituting the ink set to the recording medium to which the reaction liquid has been fixed.

17. An image-forming method which forms an image composed of an image formed by a black ink and an image formed by at least one-color color ink which are adjacent to each other, using the ink set according to claim 15, wherein:

scanning for applying the black ink to form the image and thereafter scanning for applying at least one-color color ink to an area adjacent to that image are performed to form the image.

18. The image-forming method according to claim 17, wherein the color ink is applied by scanning with delay of at least one scanning after application of the black ink by scanning.

19. The image-forming method according to claim 17, wherein the inks are applied by the use of a recording head in which an ejection orifice line for ejecting a black ink therefrom and ejection orifice lines for ejecting color inks therefrom are placed to be shifted from each other in a secondary scanning direction.

20. A cyan ink, for use in a recording apparatus which forms images by the use of the cyan ink, a magenta ink, and a yellow ink, in which each ink comprises at least water, a water-insoluble coloring material, and a plurality of water-soluble organic solvents having (a) a good medium or good mediums for the water-insoluble coloring material and (b) a poor medium or poor mediums for the water-insoluble coloring material, wherein:

the ratio $B_1/A_1$ is from 0.5 or more to 3.0 or less, where $A_1$ denotes the total content (mass %) of the good medium based on the total mass of the cyan ink and $B_1$ denotes the total content (mass %) of the poor medium based on the total mass of the cyan ink; and a water-soluble organic solvent which shows the maximum Ka value among the respective Ka values of the plurality of water-soluble organic solvents as determined by the Bristow method is the poor medium.

21. A magenta ink, for use in a recording apparatus which forms images by the use of a cyan ink, the magenta ink, and a yellow ink, in which each ink comprises at least water, a water-insoluble coloring material, and a plurality of water-soluble organic solvents having (a) a good medium or good mediums for the water-insoluble coloring material and (b) a poor medium or poor mediums for the water-insoluble coloring material, wherein:

the ratio $B_2/A_2$ is from 0.5 or more to 3.0 or less, where $A_2$ denotes the total content (mass %) of the good medium based on the total mass of the magenta ink and $B_2$ denotes the total content (mass %) of the poor medium based on the total mass of the magenta ink; and a water-soluble organic solvent which shows the maximum Ka value among the respective Ka values of the plurality of water-soluble organic solvents as determined by the Bristow method is the poor medium.

22. A yellow ink, for use in a recording apparatus which forms images by the use of a cyan ink, a magenta ink, and the yellow ink, in which each ink comprises at least water, a water-insoluble coloring material, and a plurality of water-soluble organic solvents having (a) a good medium or good mediums for the water-insoluble coloring material and (b) a poor medium or poor mediums for the water-insoluble coloring material, wherein:

the ratio $B_3/A_3$ is from 0.5 or more to 3.0 or less, where $A_3$ denotes the total content (mass %) of the good medium based on the total mass of the yellow ink and $B_3$ denotes the total content (mass %) of the poor medium based on the total mass of the yellow ink; and a water-soluble organic solvent which shows the maximum Ka value among the respective Ka values of the plurality of water-soluble organic solvents as determined by the Bristow method is the poor medium.

23. An image-forming method which forms an image composed of an image formed by a black ink and an image formed by at least one-color color ink which are adjacent to each other, using the ink set according to claim 14, wherein:

scanning for applying the black ink to form the image and thereafter scanning for applying at least one-color color ink to an area adjacent to that image are performed to form the image.

24. The image-forming method according to claim 23, wherein the color ink is applied by scanning with delay of at least one scanning after application of the black ink by scanning.

25. The image-forming method according to claim 23, wherein the inks are applied by the use of a recording head in which an ejection orifice line for ejecting a black ink therefrom and ejection lines for ejecting color inks therefrom are placed to be shifted from each other in a secondary scanning direction.

* * * * *

UNITED STATES PATENT AND TRADEMARK OFFICE
CERTIFICATE OF CORRECTION

PATENT NO. : 7,402,200 B2
APPLICATION NO. : 11/313670
DATED : July 22, 2008
INVENTOR(S) : Takashi Imai et al.

It is certified that error appears in the above-identified patent and that said Letters Patent is hereby corrected as shown below:

ON THE TITLE PAGE
　　　　Item --(*) Notice: This patent is subject to a terminal disclaimer.-- should be inserted.

COLUMN 1
　　　　Line 16, "processes," should read --process,--.

COLUMN 3
　　　　Line 18, "medium" should read --medium or--.

COLUMN 5
　　　　Line 66, "become" should read --becomes--.

COLUMN 6
　　　　Line 7, "illustration" should read --illustrations--.
　　　　Line 46, "bleed." should read --bleeding.--.

COLUMN 12
　　　　Line 47, "m" should read --$m^{-2}$--.
　　　　Line 48, "2·msec$^{-1/2}$," should read --·msec$^{-1/2}$,--.
　　　　Line 49, "m" should read --$m^{-2}$--.
　　　　Line 50, "2·msec$^{-1/2}$." should read --·msec$^{-1/2}$.--.

COLUMN 18
　　　　Line 38, "preferably" should read --preferably be--.

COLUMN 19
　　　　Line 8, "preferably" should read --preferably be--.

COLUMN 21
　　　　Line 32, "n" (second occurrence) should read --m--.

COLUMN 35
　　　　Line 57, "an modified" should read --a modified--.

COLUMN 37
　　　　Line 29, "materials, an" should read --materials, a--.

UNITED STATES PATENT AND TRADEMARK OFFICE
CERTIFICATE OF CORRECTION

PATENT NO.        : 7,402,200 B2
APPLICATION NO.   : 11/313670
DATED             : July 22, 2008
INVENTOR(S)       : Takashi Imai et al.

It is certified that error appears in the above-identified patent and that said Letters Patent is hereby corrected as shown below:

COLUMN 39
 Line 37, "magenta" should read --yellow--.
 Line 39, "magenta" should read --yellow--.
 Line 65, "magenta" should read --black--.
 Line 67, "magenta" should read --black--.

COLUMN 40
 Line 13, "wherein the" should read --wherein--.

COLUMN 44
 Line 12, "ejection" should read --ejection orifice--.

Signed and Sealed this

Sixth Day of January, 2009

JON W. DUDAS
*Director of the United States Patent and Trademark Office*